US012142842B2

(12) United States Patent
Sun

(10) Patent No.: US 12,142,842 B2
(45) Date of Patent: Nov. 12, 2024

(54) ANTENNA ARRAYS WITH SEPARATE RESONANCES AND TERMINATION NETWORKS FOR MULTIPLE MILLIMETER WAVE FREQUENCY BANDS

(71) Applicant: Skyworks Solutions, Inc., Irvine, CA (US)

(72) Inventor: Weimin Sun, Santa Rosa Valley, CA (US)

(73) Assignee: Skyworks Solutions, Inc., Irvine, CA (US)

( * ) Notice: Subject to any disclaimer, the term of this patent is extended or adjusted under 35 U.S.C. 154(b) by 0 days.

(21) Appl. No.: 17/653,694

(22) Filed: Mar. 7, 2022

(65) Prior Publication Data

US 2022/0302604 A1 Sep. 22, 2022

Related U.S. Application Data

(60) Provisional application No. 63/200,616, filed on Mar. 18, 2021.

(51) Int. Cl.
*H01Q 21/29* (2006.01)
*H01Q 5/35* (2015.01)
*H01Q 5/385* (2015.01)

(52) U.S. Cl.
CPC ............. *H01Q 21/293* (2013.01); *H01Q 5/35* (2015.01); *H01Q 5/385* (2015.01)

(58) Field of Classification Search
CPC ................................ H04L 5/06; H01Q 21/065
USPC .......................................................... 343/702
See application file for complete search history.

(56) References Cited

U.S. PATENT DOCUMENTS

| | | | | |
|---|---|---|---|---|
| 3,725,936 | A | 4/1973 | Sherman | |
| 3,956,751 | A | 5/1976 | Herman | |
| 4,352,200 | A | 9/1982 | Oxman | |
| 5,929,825 | A | 7/1999 | Niu et al. | |
| 6,686,888 | B1 | 2/2004 | Wendt et al. | |
| 7,348,931 | B2 * | 3/2008 | Suzuki | H01Q 1/50 343/822 |
| 7,940,184 | B2 | 5/2011 | Spivey, Jr. | |
| 8,717,247 | B2 | 5/2014 | Tikka et al. | |
| 9,077,437 | B2 | 7/2015 | Ikonen et al. | |
| 9,543,661 | B2 * | 1/2017 | Lee | H01Q 21/0006 |
| 10,145,743 | B2 | 12/2018 | Timofeev et al. | |
| 10,263,336 | B1 * | 4/2019 | Wong | H01Q 1/521 |
| 10,505,781 | B2 | 12/2019 | Chang et al. | |
| 10,658,765 | B2 * | 5/2020 | Chavali | H01Q 1/2283 |
| 10,693,231 | B2 * | 6/2020 | Dunworth | H01Q 5/335 |
| 10,924,164 | B2 | 2/2021 | Brunel et al. | |
| 11,323,158 | B2 * | 5/2022 | Brunel | H04W 52/42 |
| 11,394,125 | B2 * | 7/2022 | Sur | H01Q 9/0407 |

(Continued)

*Primary Examiner* — Hoang V Nguyen
*Assistant Examiner* — Brandon Sean Woods
(74) *Attorney, Agent, or Firm* — Knobbe, Martens, Olson & Bear, LLP

(57) ABSTRACT

Antenna arrays with separate resonances and termination networks for multiple millimeter wave frequency bands are provided herein. In certain embodiments, an antenna array includes a first antenna element that receives the first radio frequency transmit signal at an input. The first antenna element has a first resonant mode and a second resonant mode. The antenna array further includes a first termination network connected to the input of the first antenna element and a second termination network connected to the input of the first antenna element.

20 Claims, 16 Drawing Sheets

(56) References Cited

U.S. PATENT DOCUMENTS

| | | | | |
|---|---|---|---|---|
| 2018/0241122 | A1* | 8/2018 | Jalali Mazlouman | ... H01Q 3/34 |
| 2021/0234246 | A1 | 7/2021 | Ganesan | |

* cited by examiner mXn DL MIMO nXm UL MIMO

ANTENNA ARRAYS WITH SEPARATE RESONANCES AND TERMINATION NETWORKS FOR MULTIPLE MILLIMETER WAVE FREQUENCY BANDS

CROSS-REFERENCE TO RELATED APPLICATIONS

This application claims the benefit of priority under 35 U.S.C. § 119 of U.S. Provisional Patent Application No. 63/200,616, filed Mar. 18, 2021 and titled "ANTENNA ARRAYS WITH SEPARATE RESONANCES AND TERMINATION NETWORKS FOR MULTIPLE MILLIMETER WAVE FREQUENCY BANDS," which is herein incorporated by reference in its entirety.

BACKGROUND

Field

Embodiments of the invention relate to electronic systems, and in particular, to radio frequency (RF) electronics.

Description of the Related Technology

Radio frequency (RF) communication systems wirelessly communicate RF signals using antennas.

Examples of RF communication systems that utilize antennas for communication include, but are not limited to mobile phones, tablets, base stations, network access points, laptops, and wearable electronics. RF signals have a frequency in the range from about 30 kHz to 300 GHz, for instance, in the range of about 425 MHz to about 7.125 GHz for Frequency Range 1 (FR1) of the Fifth Generation (5G) communication standard or in the range of about 24.250 GHz to about 71.000 GHz for Frequency Range 2 (FR2) of the 5G communication standard.

SUMMARY

In certain embodiments, the present disclosure relates to a mobile device. The mobile device includes a transceiver configured to generate a first radio frequency transmit signal, a front end system including a plurality of power amplifiers including a first power amplifier configured to amplify the first radio frequency transmit signal to generate a first amplified radio frequency transmit signal, and an antenna array including a first antenna element configured to receive the first amplified radio frequency transmit signal at an input. The first antenna element has a first resonant mode and a second resonant mode. The antenna array further including a first termination network connected to the input of the first antenna element and a second termination network connected to the input of the first antenna element.

In some embodiments, the first termination network is operable to provide termination at a first frequency corresponding to the first resonant mode, and the second termination network is operable to provide termination at a second frequency corresponding to the second resonant mode.

In various embodiments, the first resonant mode is in a 24 gigahertz frequency band and the second resonant mode is in a 39 gigahertz frequency band.

In several embodiments, the plurality of power amplifiers further includes a second power amplifier configured to amplify a second radio frequency transmit signal to generate a second amplified radio frequency transmit signal, and the antenna array further includes a second antenna element configured to receive the second amplified radio frequency transmit signal.

In some embodiments, the first termination network and the second termination network are adjustable.

In various embodiments, the front end system further includes a band switch configured to provide the first power amplifier with the first radio frequency transmit signal based on selecting between a first radio frequency input signal of a first frequency and a second radio frequency input signal of a second frequency. According to a number of embodiments, the first frequency corresponds to the first resonant mode, and the second frequency corresponds to the second resonant mode.

In several embodiments, the first antenna element is a patch antenna.

In some embodiments, the first antenna element is an edge-fired antenna.

In certain embodiments, the present disclosure relates to a packaged module. The packaged module includes a package substrate having an antenna array formed thereon, the antenna array including a first antenna element configured to receive a first amplified radio frequency transmit signal at an input. The first antenna element has a first resonant mode and a second resonant mode. The antenna array further includes a first termination network connected to the input of the first antenna element and a second termination network connected to the input of the first antenna element. The packaged module further includes a semiconductor die attached to the package substrate and having a plurality of power amplifiers formed thereon. The plurality of power amplifiers includes a first power amplifier configured to amplify a first radio frequency transmit signal to generate the first amplified radio frequency transmit signal.

In various embodiments, the first termination network is operable to provide termination at a first frequency corresponding to the first resonant mode, and the second termination network is operable to provide termination at a second frequency corresponding to the second resonant mode.

In several embodiments, the first resonant mode is in a 24 gigahertz frequency band and the second resonant mode is in a 39 gigahertz frequency band.

In some embodiments, the first termination network and the second termination network are adjustable.

In various embodiments, the semiconductor die further includes a band switch configured to provide the first power amplifier with the first radio frequency transmit signal based on selecting between a first radio frequency input signal of a first frequency and a second radio frequency input signal of a second frequency. According to a number of embodiments, the first frequency corresponds to the first resonant mode, and the second frequency corresponds to the second resonant mode.

In several embodiments, the first antenna element is a patch antenna on a surface of the package substrate.

In some embodiments, the first antenna element is an edge-fired antenna on a side of the package substrate.

In certain embodiments, the present disclosure relates to a method of wireless transmission in a mobile device. The method includes generating a first radio frequency transmit signal using a transceiver, amplifying the first radio frequency transmit signal to generate a first amplified radio frequency transmit signal using a first power amplifier, and receiving the first amplified radio frequency transmit signal at an input of a first antenna element of an antenna array. The first antenna element has a first resonant mode and a second resonant mode. The method further includes terminating the first antenna element using a first termination network connected to the input of the first antenna element and a second termination network connected to the input of the first antenna element.

In various embodiments, the method further includes providing termination at a first frequency corresponding to the first resonant mode using the first termination network, and providing termination at a second frequency corresponding to the second resonant mode using the second termination network.

In several embodiments, the first resonant mode is in a 24 gigahertz frequency band and the second resonant mode is in a 39 gigahertz frequency band.

DETAILED DESCRIPTION OF EMBODIMENTS

Figure 1:
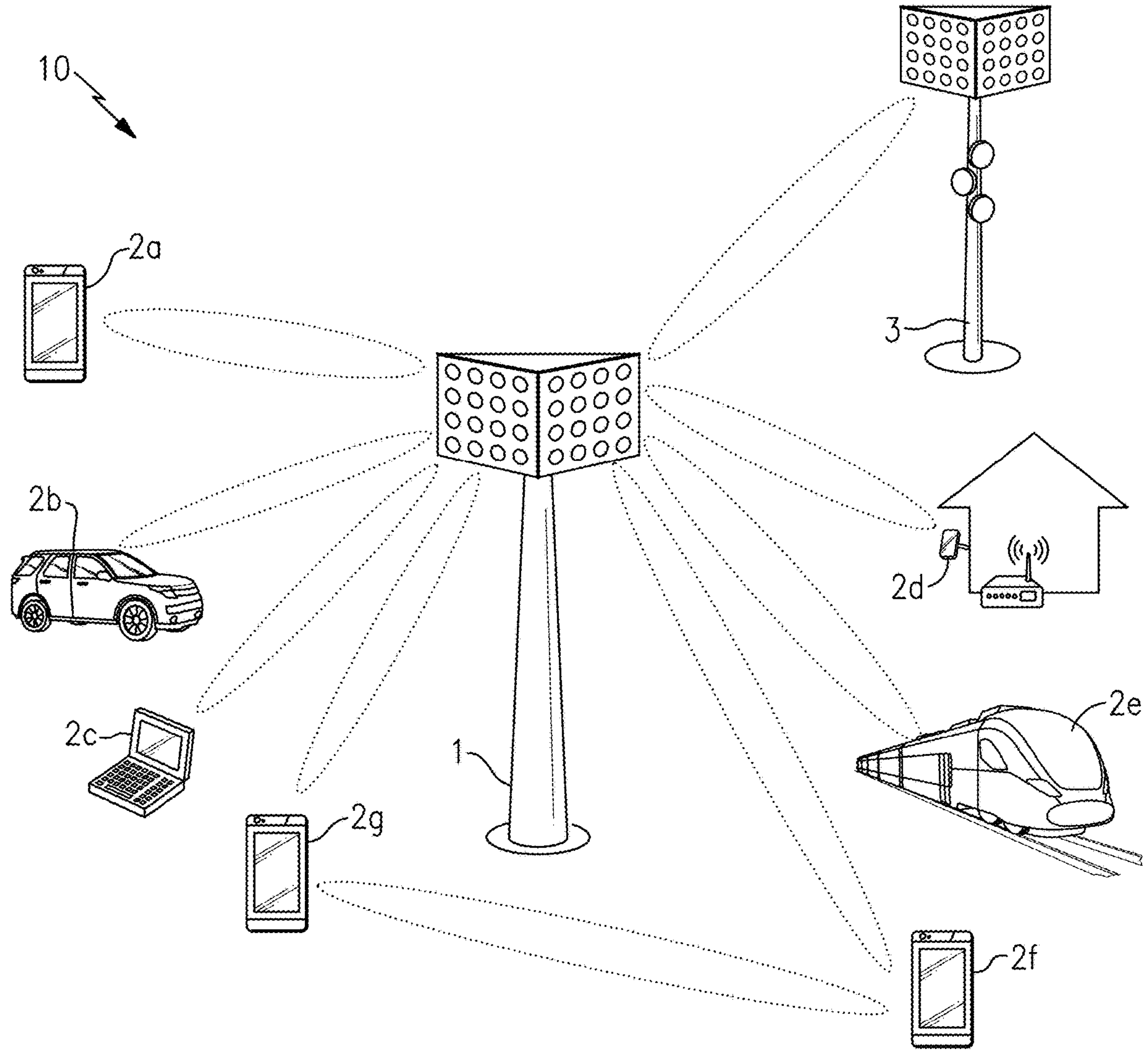
FIG. 1 is a schematic diagram of one example of a communication network.

The following detailed description of certain embodiments presents various descriptions of specific embodiments. However, the innovations described herein can be embodied in a multitude of different ways, for example, as defined and covered by the claims. In this description, reference is made to the drawings where like reference numerals can indicate identical or functionally similar elements. It will be understood that elements illustrated in the figures are not necessarily drawn to scale. Moreover, it will be understood that certain embodiments can include more elements than illustrated in a drawing and/or a subset of the elements illustrated in a drawing. Further, some embodiments can incorporate any suitable combination of features from two or more drawings.

The International Telecommunication Union (ITU) is a specialized agency of the United Nations (UN) responsible for global issues concerning information and communication technologies, including the shared global use of radio spectrum.

The 3rd Generation Partnership Project (3GPP) is a collaboration between groups of telecommunications standard bodies across the world, such as the Association of Radio Industries and Businesses (ARIB), the Telecommunications Technology Committee (TTC), the China Communications Standards Association (CCSA), the Alliance for Telecommunications Industry Solutions (ATIS), the Telecommunications Technology Association (TTA), the European Telecommunications Standards Institute (ETSI), and the Telecommunications Standards Development Society, India (TSDSI).

Working within the scope of the ITU, 3GPP develops and maintains technical specifications for a variety of mobile communication technologies, including, for example, second generation (2G) technology (for instance, Global System for Mobile Communications (GSM) and Enhanced Data Rates for GSM Evolution (EDGE)), third generation (3G) technology (for instance, Universal Mobile Telecommunications System (UMTS) and High Speed Packet Access (HSPA)), and fourth generation (4G) technology (for instance, Long Term Evolution (LTE) and LTE-Advanced).

The technical specifications controlled by 3GPP can be expanded and revised by specification releases, which can span multiple years and specify a breadth of new features and evolutions.

In one example, 3GPP introduced carrier aggregation (CA) for LTE in Release 10. Although initially introduced with two downlink carriers, 3GPP expanded carrier aggregation in Release 14 to include up to five downlink carriers and up to three uplink carriers. Other examples of new features and evolutions provided by 3GPP releases include, but are not limited to, License Assisted Access (LAA), enhanced LAA (eLAA), Narrowband Internet of things (NB-IOT), Vehicle-to-Everything (V2X), and High Power User Equipment (HPUE).

3GPP introduced Phase 1 of fifth generation (5G) technology in Release 15, and introduced Phase 2 of 5G technology in Release 16. Subsequent 3GPP releases will further evolve and expand 5G technology. 5G technology is also referred to herein as 5G New Radio (NR).

5G NR supports or plans to support a variety of features, such as communications over millimeter wave spectrum, beamforming capability, high spectral efficiency waveforms, low latency communications, multiple radio numerology, and/or non-orthogonal multiple access (NOMA). Although such RF functionalities offer flexibility to networks and enhance user data rates, supporting such features can pose a number of technical challenges.

The teachings herein are applicable to a wide variety of communication systems, including, but not limited to, communication systems using advanced cellular technologies, such as LTE-Advanced, LTE-Advanced Pro, and/or 5G NR.

FIG. 1 is a schematic diagram of one example of a communication network 10. The communication network 10 includes a macro cell base station 1, a small cell base station 3, and various examples of user equipment (UE), including a first mobile device 2*a*, a wireless-connected car 2*b*, a laptop 2*c*, a stationary wireless device 2*d*, a wireless-connected train 2*e*, a second mobile device 2*f*, and a third mobile device 2*g*.

Although specific examples of base stations and user equipment are illustrated in FIG. 1, a communication network can include base stations and user equipment of a wide variety of types and/or numbers.

For instance, in the example shown, the communication network 10 includes the macro cell base station 1 and the small cell base station 3. The small cell base station 3 can operate with relatively lower power, shorter range, and/or with fewer concurrent users relative to the macro cell base station 1. The small cell base station 3 can also be referred to as a femtocell, a picocell, or a microcell. Although the communication network 10 is illustrated as including two base stations, the communication network 10 can be implemented to include more or fewer base stations and/or base stations of other types.

Although various examples of user equipment are shown, the teachings herein are applicable to a wide variety of user equipment, including, but not limited to, mobile phones, tablets, laptops, IoT devices, wearable electronics, customer premises equipment (CPE), wireless-connected vehicles, wireless relays, and/or a wide variety of other communication devices. Furthermore, user equipment includes not only currently available communication devices that operate in a cellular network, but also subsequently developed communication devices that will be readily implementable with the inventive systems, processes, methods, and devices as described and claimed herein.

The illustrated communication network 10 of FIG. 1 supports communications using a variety of cellular technologies, including, for example, 4G LTE and 5G NR. In certain implementations, the communication network 10 is further adapted to provide a wireless local area network (WLAN), such as WiFi. Although various examples of communication technologies have been provided, the communication network 10 can be adapted to support a wide variety of communication technologies.

Various communication links of the communication network 10 have been depicted in FIG. 1. The communication links can be duplexed in a wide variety of ways, including, for example, using frequency-division duplexing (FDD) and/or time-division duplexing (TDD). FDD is a type of radio frequency communications that uses different frequencies for transmitting and receiving signals. FDD can provide a number of advantages, such as high data rates and low latency. In contrast, TDD is a type of radio frequency communications that uses about the same frequency for transmitting and receiving signals, and in which transmit and receive communications are switched in time. TDD can provide a number of advantages, such as efficient use of spectrum and variable allocation of throughput between transmit and receive directions.

In certain implementations, user equipment can communicate with a base station using one or more of 4G LTE, 5G NR, and WiFi technologies. In certain implementations, enhanced license assisted access (eLAA) is used to aggregate one or more licensed frequency carriers (for instance, licensed 4G LTE and/or 5G NR frequencies), with one or more unlicensed carriers (for instance, unlicensed WiFi frequencies).

As shown in FIG. 1, the communication links include not only communication links between UE and base stations, but also UE to UE communications and base station to base station communications. For example, the communication network 10 can be implemented to support self-fronthaul and/or self-backhaul (for instance, as between mobile device 2*g* and mobile device 2*f*).

The communication links can operate over a wide variety of frequencies. In certain implementations, communications are supported using 5G NR technology over one or more frequency bands that are less than 6 Gigahertz (GHz) and/or over one or more frequency bands that are greater than 6 GHz. For example, the communication links can serve Frequency Range 1 (FR1), Frequency Range 2 (FR2), or a combination thereof. In one embodiment, one or more of the mobile devices support a HPUE power class specification.

In certain implementations, a base station and/or user equipment communicates using beamforming. For example, beamforming can be used to focus signal strength to overcome path losses, such as high loss associated with communicating over high signal frequencies. In certain embodiments, user equipment, such as one or more mobile phones, communicate using beamforming on millimeter wave frequency bands in the range of 30 GHz to 300 GHz and/or upper centimeter wave frequencies in the range of 6 GHz to 30 GHz, or more particularly, 24 GHz to 30 GHz.

Different users of the communication network 10 can share available network resources, such as available frequency spectrum, in a wide variety of ways.

In one example, frequency division multiple access (FDMA) is used to divide a frequency band into multiple frequency carriers. Additionally, one or more carriers are allocated to a particular user. Examples of FDMA include, but are not limited to, single carrier FDMA (SC-FDMA) and orthogonal FDMA (OFDMA). OFDMA is a multicarrier technology that subdivides the available bandwidth into multiple mutually orthogonal narrowband subcarriers, which can be separately assigned to different users.

Other examples of shared access include, but are not limited to, time division multiple access (TDMA) in which a user is allocated particular time slots for using a frequency resource, code division multiple access (CDMA) in which a frequency resource is shared amongst different users by assigning each user a unique code, space-divisional multiple access (SDMA) in which beamforming is used to provide shared access by spatial division, and non-orthogonal multiple access (NOMA) in which the power domain is used for multiple access. For example, NOMA can be used to serve multiple users at the same frequency, time, and/or code, but with different power levels.

Enhanced mobile broadband (eMBB) refers to technology for growing system capacity of LTE networks. For example, eMBB can refer to communications with a peak data rate of at least 10 Gbps and a minimum of 100 Mbps for each user. Ultra-reliable low latency communications (uRLLC) refers to technology for communication with very low latency, for instance, less than 2 milliseconds. uRLLC can be used for mission-critical communications such as for autonomous driving and/or remote surgery applications. Massive machine-type communications (mMTC) refers to low cost and low data rate communications associated with wireless connections to everyday objects, such as those associated with Internet of Things (IoT) applications.

The communication network 10 of FIG. 1 can be used to support a wide variety of advanced communication features, including, but not limited to, eMBB, uRLLC, and/or mMTC.

Figure 2A:
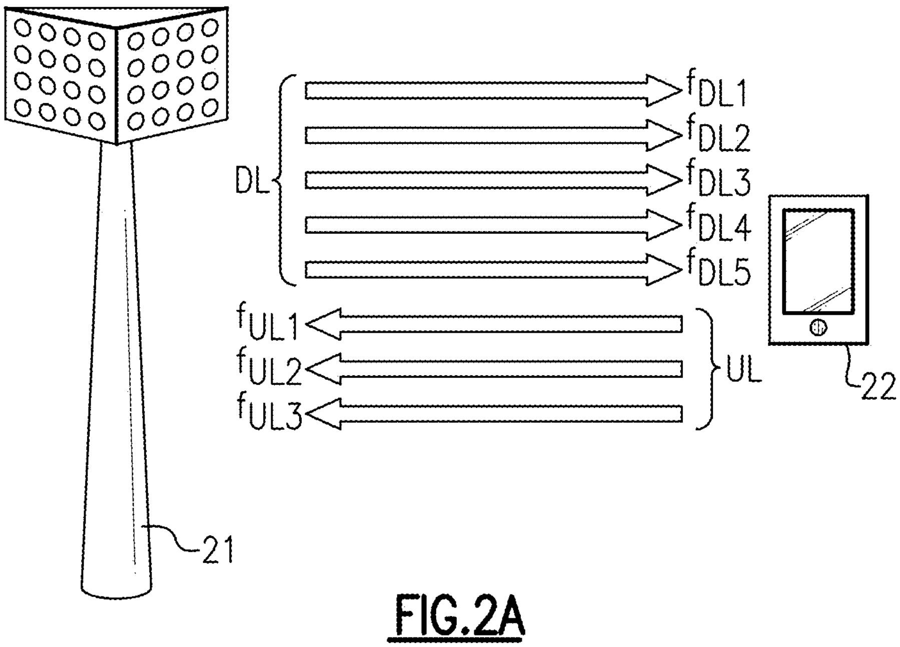
FIG. 2A is a schematic diagram of one example of a communication link using carrier aggregation.

FIG. 2A is a schematic diagram of one example of a communication link using carrier aggregation. Carrier aggregation can be used to widen bandwidth of the communication link by supporting communications over multiple frequency carriers, thereby increasing user data rates and enhancing network capacity by utilizing fragmented spectrum allocations.

In the illustrated example, the communication link is provided between a base station 21 and a mobile device 22. As shown in FIG. 2A, the communications link includes a downlink channel used for RF communications from the base station 21 to the mobile device 22, and an uplink channel used for RF communications from the mobile device 22 to the base station 21.

Although FIG. 2A illustrates carrier aggregation in the context of FDD communications, carrier aggregation can also be used for TDD communications.

In certain implementations, a communication link can provide asymmetrical data rates for a downlink channel and an uplink channel. For example, a communication link can be used to support a relatively high downlink data rate to enable high speed streaming of multimedia content to a mobile device, while providing a relatively slower data rate for uploading data from the mobile device to the cloud.

In the illustrated example, the base station 21 and the mobile device 22 communicate via carrier aggregation, which can be used to selectively increase bandwidth of the communication link. Carrier aggregation includes contiguous aggregation, in which contiguous carriers within the same operating frequency band are aggregated. Carrier aggregation can also be non-contiguous, and can include carriers separated in frequency within a common band or in different bands.

In the example shown in FIG. 2A, the uplink channel includes three aggregated component carriers $f_{UL1}$, $f_{UL2}$, and $f_{UL3}$. Additionally, the downlink channel includes five aggregated component carriers $f_{DL1}$, $f_{DL2}$, $f_{DL3}$, $f_{DL4}$, and $f_{DL5}$. Although one example of component carrier aggregation is shown, more or fewer carriers can be aggregated for uplink and/or downlink. Moreover, a number of aggregated carriers can be varied over time to achieve desired uplink and downlink data rates.

For example, a number of aggregated carriers for uplink and/or downlink communications with respect to a particular mobile device can change over time. For example, the number of aggregated carriers can change as the device moves through the communication network and/or as network usage changes over time.

Figure 2B:
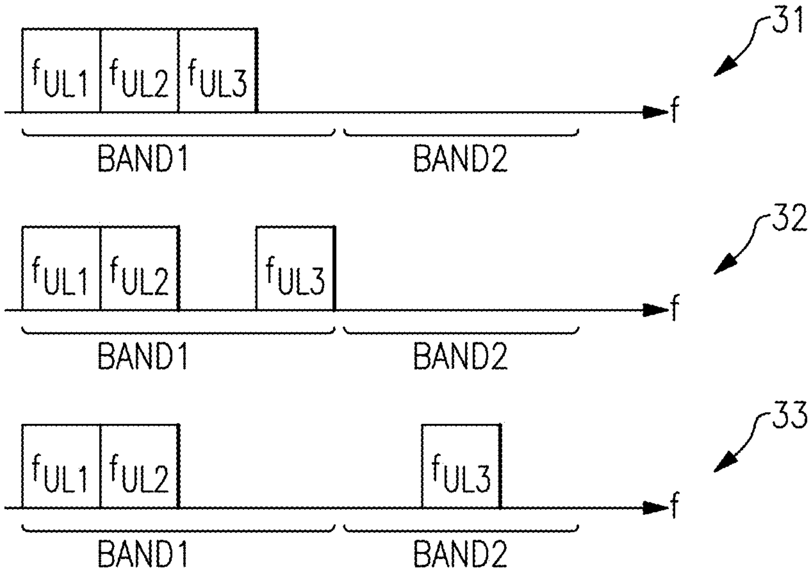
FIG. 2B illustrates various examples of uplink carrier aggregation for the communication link of FIG. 2A.

FIG. 2B illustrates various examples of uplink carrier aggregation for the communication link of FIG. 2A. FIG. 2B includes a first carrier aggregation scenario 31, a second carrier aggregation scenario 32, and a third carrier aggregation scenario 33, which schematically depict three types of carrier aggregation.

The carrier aggregation scenarios 31-33 illustrate different spectrum allocations for a first component carrier full, a second component carrier $f_{UL2}$, and a third component carrier $f_{UL3}$. Although FIG. 2B is illustrated in the context of aggregating three component carriers, carrier aggregation can be used to aggregate more or fewer carriers. Moreover, although illustrated in the context of uplink, the aggregation scenarios are also applicable to downlink.

The first carrier aggregation scenario 31 illustrates intra-band contiguous carrier aggregation, in which component carriers that are adjacent in frequency and in a common frequency band are aggregated. For example, the first carrier aggregation scenario 31 depicts aggregation of component carriers $f_{UL1}$, $f_{UL2}$, and $f_{UL3}$ that are contiguous and located within a first frequency band BAND1.

With continuing reference to FIG. 2B, the second carrier aggregation scenario 32 illustrates intra-band non-continuous carrier aggregation, in which two or more components carriers that are non-adjacent in frequency and within a common frequency band are aggregated. For example, the second carrier aggregation scenario 32 depicts aggregation of component carriers $f_{UL1}$, $f_{UL2}$, and $f_{UL3}$ that are non-contiguous, but located within a first frequency band BAND1.

The third carrier aggregation scenario 33 illustrates inter-band non-contiguous carrier aggregation, in which component carriers that are non-adjacent in frequency and in multiple frequency bands are aggregated. For example, the third carrier aggregation scenario 33 depicts aggregation of component carriers $f_{UL1}$ and $f_{UL1}$ of a first frequency band BAND1 with component carrier $f_{UL3}$ of a second frequency band BAND2.

Figure 2C:
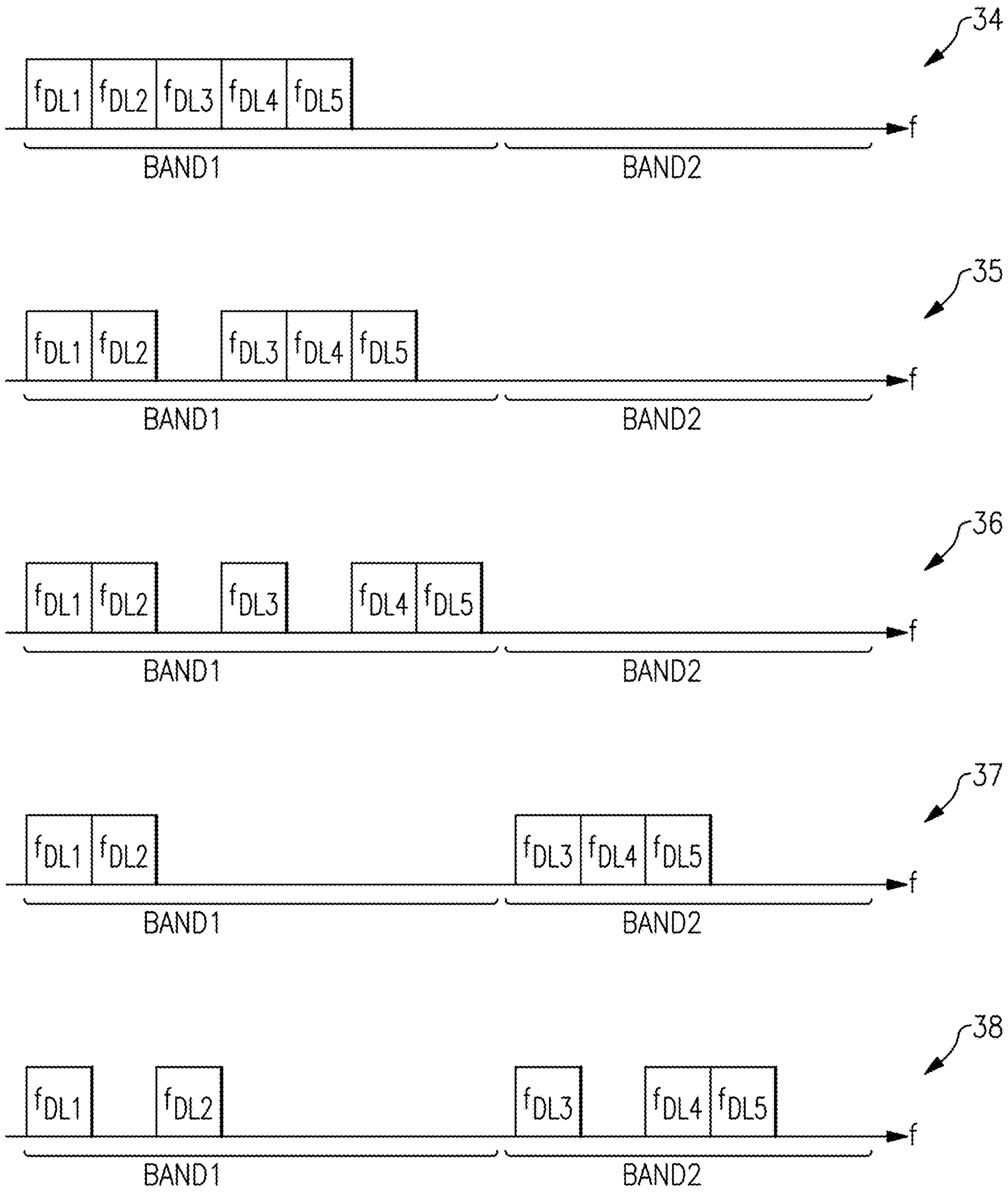
FIG. 2C illustrates various examples of downlink carrier aggregation for the communication link of FIG. 2A.

FIG. 2C illustrates various examples of downlink carrier aggregation for the communication link of FIG. 2A. The examples depict various carrier aggregation scenarios 34-38 for different spectrum allocations of a first component carrier $f_{DL1}$, a second component carrier $f_{DL2}$, a third component carrier $f_{DL3}$, a fourth component carrier $f_{DL4}$, and a fifth component carrier $f_{DL5}$. Although FIG. 2C is illustrated in the context of aggregating five component carriers, carrier aggregation can be used to aggregate more or fewer carriers. Moreover, although illustrated in the context of downlink, the aggregation scenarios are also applicable to uplink.

The first carrier aggregation scenario 34 depicts aggregation of component carriers that are contiguous and located within the same frequency band. Additionally, the second carrier aggregation scenario 35 and the third carrier aggregation scenario 36 illustrates two examples of aggregation that are non-contiguous, but located within the same frequency band. Furthermore, the fourth carrier aggregation scenario 37 and the fifth carrier aggregation scenario 38 illustrates two examples of aggregation in which component carriers that are non-adjacent in frequency and in multiple frequency bands are aggregated. As a number of aggregated component carriers increases, a complexity of possible carrier aggregation scenarios also increases.

With reference to FIGS. 2A-2C, the individual component carriers used in carrier aggregation can be of a variety of frequencies, including, for example, frequency carriers in the same band or in multiple bands. Additionally, carrier aggregation is applicable to implementations in which the individual component carriers are of about the same bandwidth as well as to implementations in which the individual component carriers have different bandwidths.

Certain communication networks allocate a particular user device with a primary component carrier (PCC) or anchor carrier for uplink and a PCC for downlink. Additionally, when the mobile device communicates using a single frequency carrier for uplink or downlink, the user device communicates using the PCC. To enhance bandwidth for uplink communications, the uplink PCC can be aggregated with one or more uplink secondary component carriers (SCCs). Additionally, to enhance bandwidth for downlink communications, the downlink PCC can be aggregated with one or more downlink SCCs.

In certain implementations, a communication network provides a network cell for each component carrier. Additionally, a primary cell can operate using a PCC, while a secondary cell can operate using a SCC. The primary and secondary cells may have different coverage areas, for instance, due to differences in frequencies of carriers and/or network environment.

License assisted access (LAA) refers to downlink carrier aggregation in which a licensed frequency carrier associated with a mobile operator is aggregated with a frequency carrier in unlicensed spectrum, such as WiFi. LAA employs a downlink PCC in the licensed spectrum that carries control and signaling information associated with the communication link, while unlicensed spectrum is aggregated for wider downlink bandwidth when available. LAA can operate with dynamic adjustment of secondary carriers to avoid WiFi users and/or to coexist with WiFi users. Enhanced license assisted access (eLAA) refers to an evolution of LAA that aggregates licensed and unlicensed spectrum for both downlink and uplink.

Figure 3A:
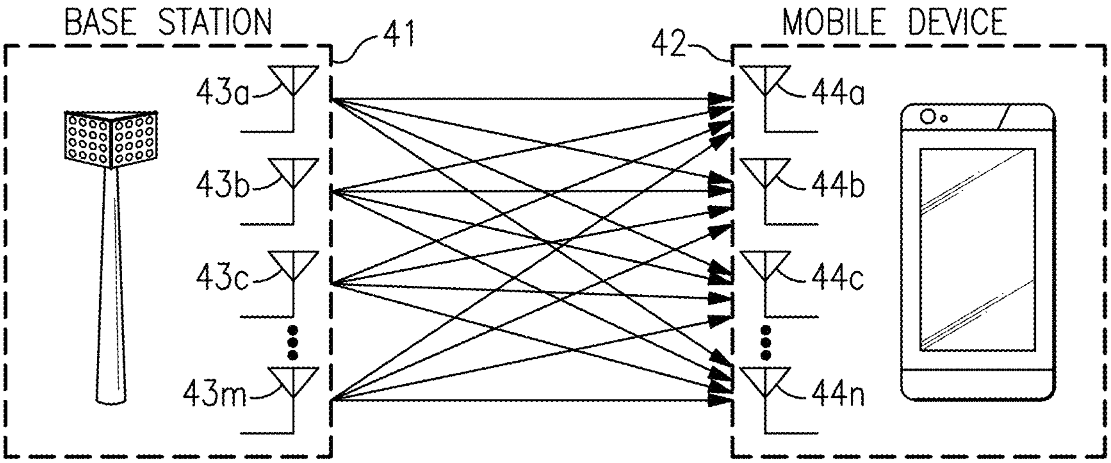
FIG. 3A is a schematic diagram of one example of a downlink channel using multi-input and multi-output (MIMO) communications.
Figure 3B:
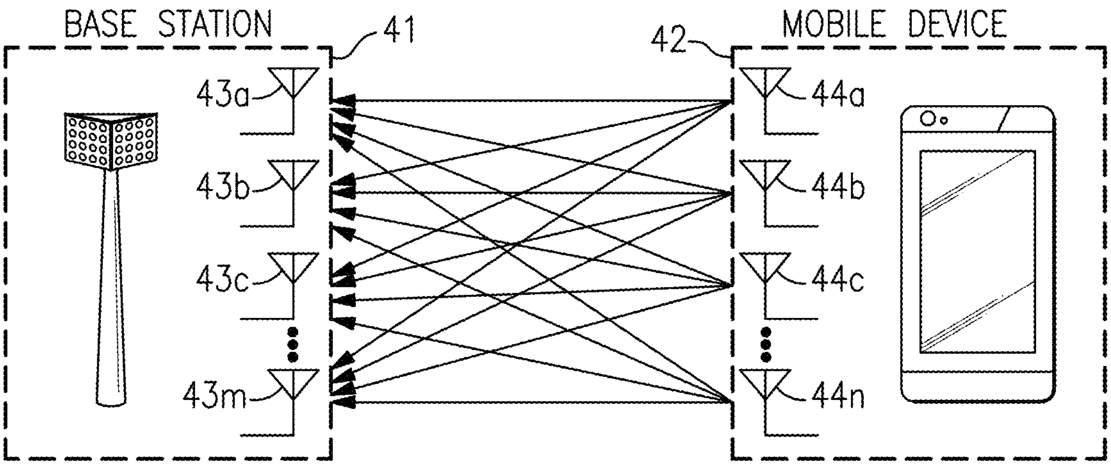
FIG. 3B is schematic diagram of one example of an uplink channel using MIMO communications.

FIG. 3A is a schematic diagram of one example of a downlink channel using multi-input and multi-output (MIMO) communications. FIG. 3B is schematic diagram of one example of an uplink channel using MIMO communications.

MIMO communications use multiple antennas for simultaneously communicating multiple data streams over common frequency spectrum. In certain implementations, the data streams operate with different reference signals to enhance data reception at the receiver. MIMO communications benefit from higher SNR, improved coding, and/or reduced signal interference due to spatial multiplexing differences of the radio environment.

MIMO order refers to a number of separate data streams sent or received. For instance, MIMO order for downlink communications can be described by a number of transmit antennas of a base station and a number of receive antennas for UE, such as a mobile device. For example, two-by-two (2×2) DL MIMO refers to MIMO downlink communications using two base station antennas and two UE antennas. Additionally, four-by-four (4×4) DL MIMO refers to MIMO downlink communications using four base station antennas and four UE antennas.

In the example shown in FIG. 3A, downlink MIMO communications are provided by transmitting using M antennas 43*a*, 43*b*, 43*c*, . . . 43*m* of the base station 41 and receiving using N antennas 44*a*, 44*b*, 44*c*, . . . 44*n* of the mobile device 42. Accordingly, FIG. 3A illustrates an example of m×n DL MIMO.

Likewise, MIMO order for uplink communications can be described by a number of transmit antennas of UE, such as a mobile device, and a number of receive antennas of a base station. For example, 2×2 UL MIMO refers to MIMO uplink communications using two UE antennas and two base station antennas. Additionally, 4×4 UL MIMO refers to MIMO uplink communications using four UE antennas and four base station antennas.

In the example shown in FIG. 3B, uplink MIMO communications are provided by transmitting using N antennas 44*a*, 44*b*, 44*c*, . . . 44*n* of the mobile device 42 and receiving using M antennas 43*a*, 43*b*, 43*c*, . . . 43*m* of the base station 41. Accordingly, FIG. 3B illustrates an example of n×m UL MIMO.

By increasing the level or order of MIMO, bandwidth of an uplink channel and/or a downlink channel can be increased.

MIMO communications are applicable to communication links of a variety of types, such as FDD communication links and TDD communication links.

Figure 3C:
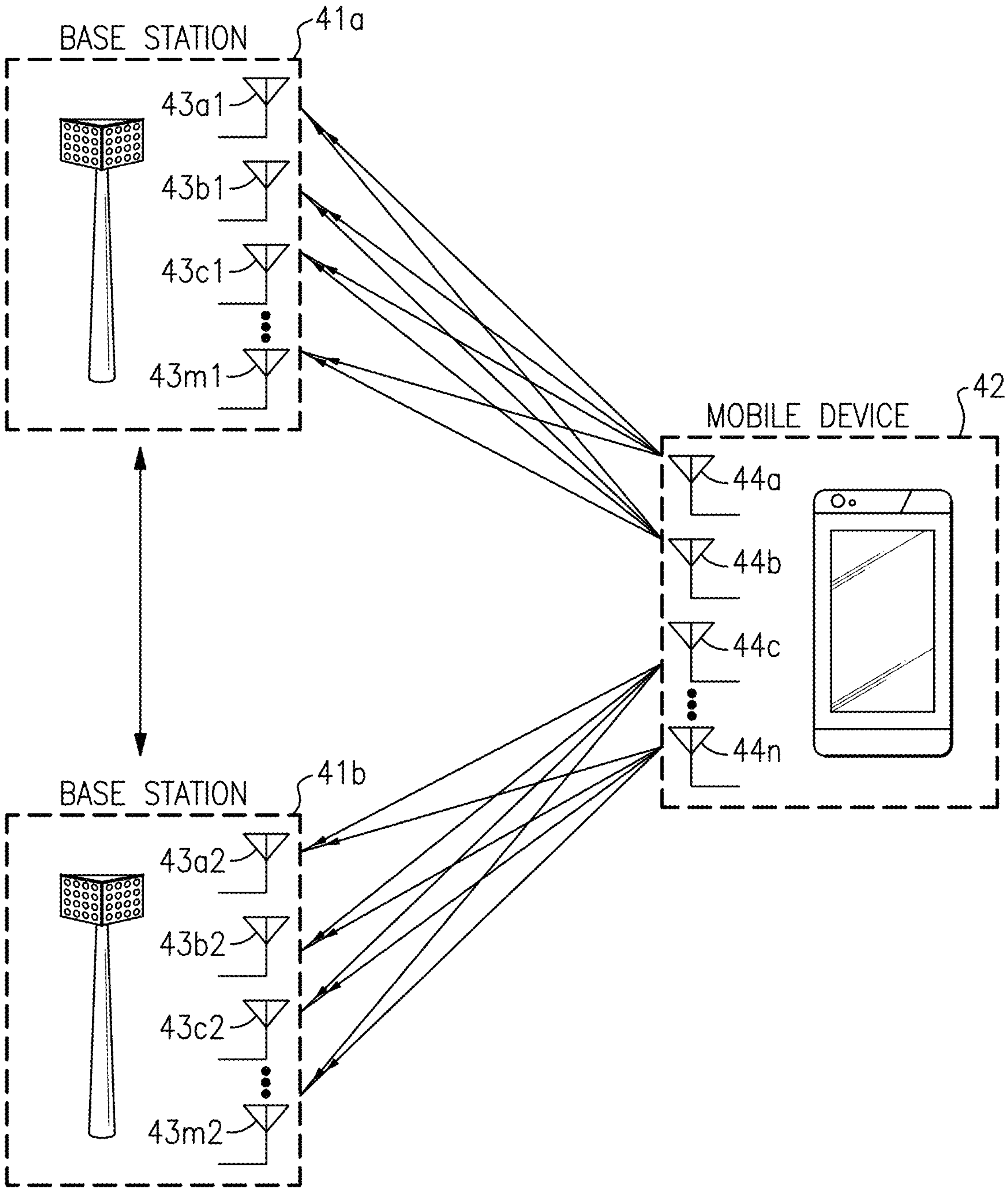
FIG. 3C is schematic diagram of another example of an uplink channel using MIMO communications.

FIG. 3C is schematic diagram of another example of an uplink channel using MIMO communications. In the example shown in FIG. 3C, uplink MIMO communications are provided by transmitting using N antennas 44*a*, 44*b*, 44*c*, . . . 44*n* of the mobile device 42. Additional a first portion of the uplink transmissions are received using M antennas 43*a*1, 43*b*1, 43*c*1, . . . 43*m*1 of a first base station 41*a*, while a second portion of the uplink transmissions are received using M antennas 43*a*2, 43*b*2, 43*c*2, . . . 43*m*2 of a second base station 41*b*. Additionally, the first base station 41*a* and the second base station 41*b* communication with one another over wired, optical, and/or wireless links.

The MIMO scenario of FIG. 3C illustrates an example in which multiple base stations cooperate to facilitate MIMO communications.

Figure 4A:
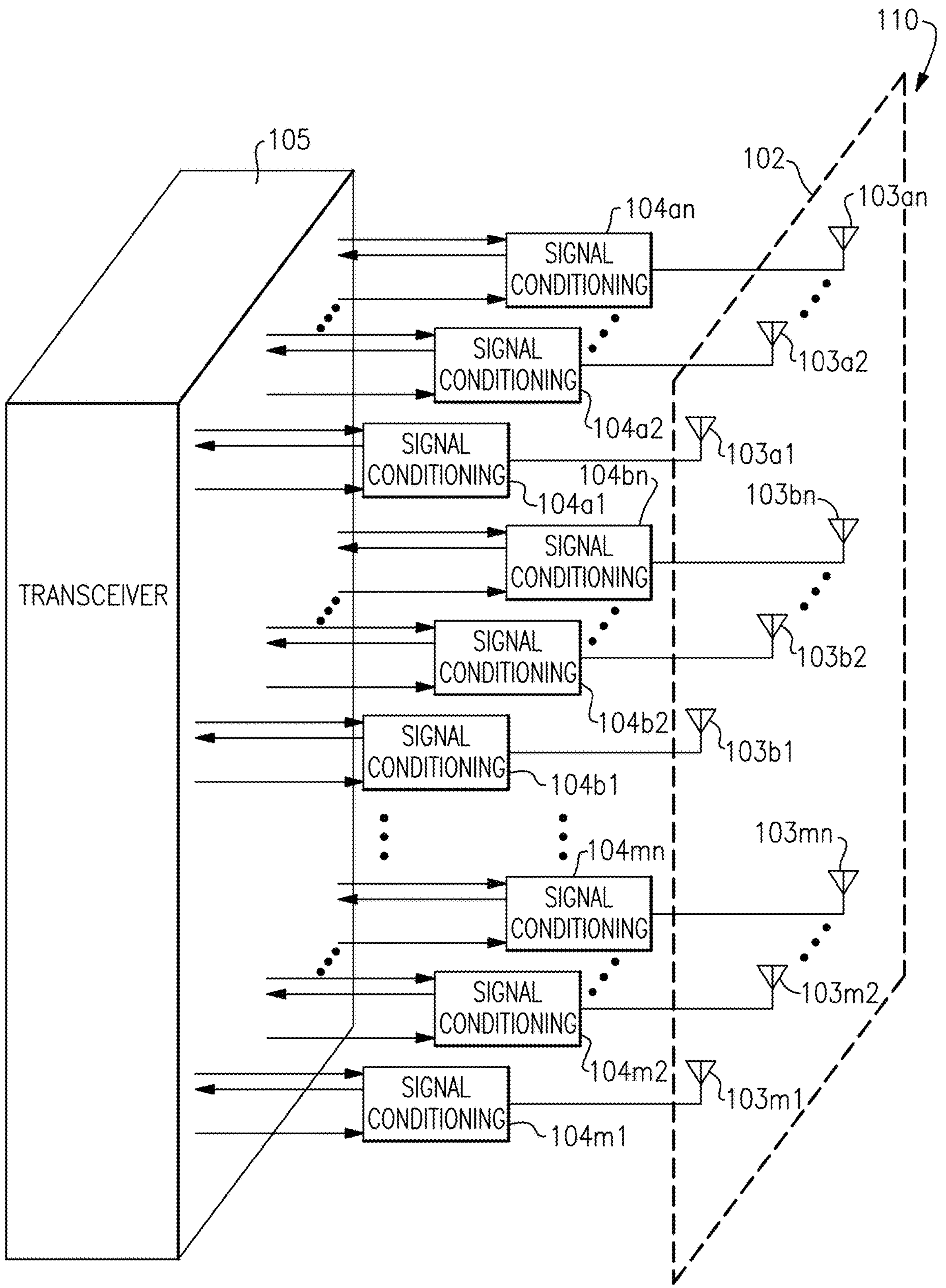
FIG. 4A is a schematic diagram of one example of a communication system that operates with beamforming.

FIG. 4A is a schematic diagram of one example of a communication system 110 that operates with beamforming. The communication system 110 includes a transceiver 105, signal conditioning circuits 104*a*1, 104*a*2 . . . 104*an*, 104*b*1, 104*b*2 . . . 104*bn*, 104*m*1, 104*m*2 . . . 104*mn*, and an antenna array 102 that includes antenna elements 103*a*1, 103*a*2 . . . 103*an*, 103*b*1, 103*b*2 . . . 103*bn*, 103*m*1, 103*m*2 . . . 103*mn*.

Communications systems that communicate using millimeter wave carriers (for instance, 30 GHz to 300 GHz), centimeter wave carriers (for instance, 3 GHz to 30 GHz), and/or other frequency carriers can employ an antenna array to provide beam formation and directivity for transmission and/or reception of signals.

For example, in the illustrated embodiment, the communication system 110 includes an array 102 of m×n antenna elements, which are each controlled by a separate signal conditioning circuit, in this embodiment. As indicated by the ellipses, the communication system 110 can be implemented with any suitable number of antenna elements and signal conditioning circuits.

With respect to signal transmission, the signal conditioning circuits can provide transmit signals to the antenna array 102 such that signals radiated from the antenna elements combine using constructive and destructive interference to generate an aggregate transmit signal exhibiting beam-like qualities with more signal strength propagating in a given direction away from the antenna array 102.

In the context of signal reception, the signal conditioning circuits process the received signals (for instance, by separately controlling received signal phases) such that more signal energy is received when the signal is arriving at the antenna array 102 from a particular direction. Accordingly, the communication system 110 also provides directivity for reception of signals.

The relative concentration of signal energy into a transmit beam or a receive beam can be enhanced by increasing the size of the array. For example, with more signal energy focused into a transmit beam, the signal is able to propagate for a longer range while providing sufficient signal level for RF communications. For instance, a signal with a large proportion of signal energy focused into the transmit beam can exhibit high effective isotropic radiated power (EIRP).

In the illustrated embodiment, the transceiver 105 provides transmit signals to the signal conditioning circuits and processes signals received from the signal conditioning circuits. As shown in FIG. 4A, the transceiver 105 generates control signals for the signal conditioning circuits. The control signals can be used for a variety of functions, such as controlling the gain and phase of transmitted and/or received signals to control beamforming.

Figure 4B:
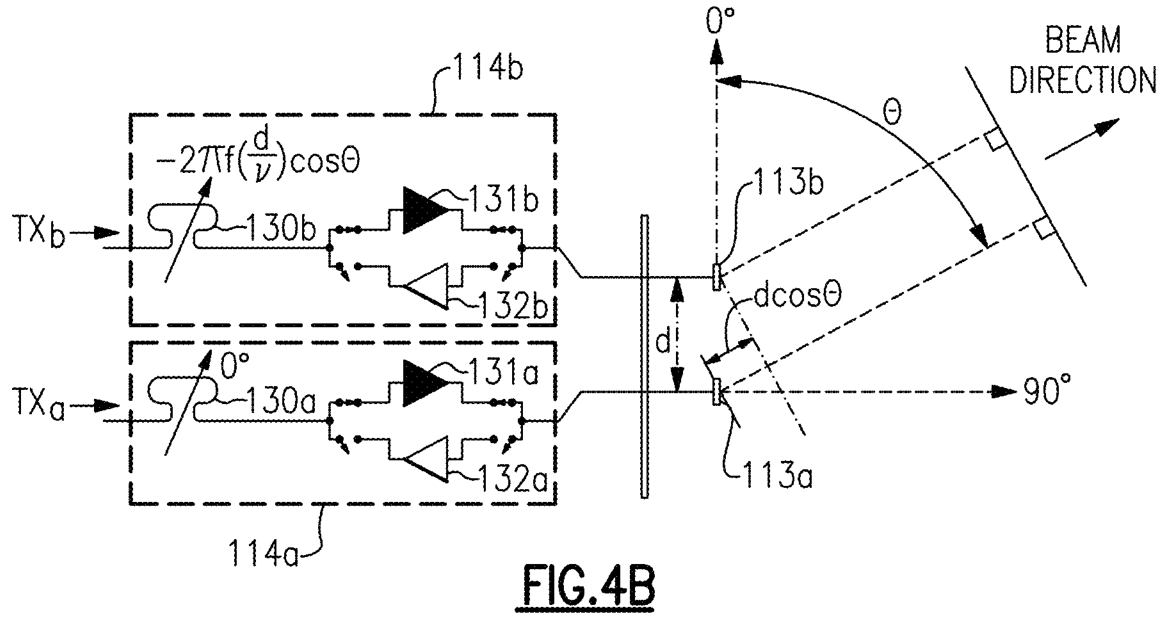
FIG. 4B is a schematic diagram of one example of beamforming to provide a transmit beam.

FIG. 4B is a schematic diagram of one example of beamforming to provide a transmit beam. FIG. 4B illustrates a portion of a communication system including a first signal conditioning circuit 114*a*, a second signal conditioning circuit 114*b*, a first antenna element 113*a*, and a second antenna element 113*b*.

Although illustrated as included two antenna elements and two signal conditioning circuits, a communication system can include additional antenna elements and/or signal conditioning circuits. For example, FIG. 4B illustrates one embodiment of a portion of the communication system 110 of FIG. 4A.

The first signal conditioning circuit 114*a* includes a first phase shifter 130*a*, a first power amplifier 131*a*, a first low noise amplifier (LNA) 132*a*, and switches for controlling selection of the power amplifier 131*a* or LNA 132*a*. Additionally, the second signal conditioning circuit 114*b* includes a second phase shifter 130*b*, a second power amplifier 131*b*, a second LNA 132*b*, and switches for controlling selection of the power amplifier 131*b* or LNA 132*b*.

Although one embodiment of signal conditioning circuits is shown, other implementations of signal conditioning circuits are possible. For instance, in one example, a signal conditioning circuit includes one or more band filters, duplexers, and/or other components.

In the illustrated embodiment, the first antenna element 113*a* and the second antenna element 113*b* are separated by a distance d. Additionally, FIG. 4B has been annotated with an angle $\theta$, which in this example has a value of about 90° when the transmit beam direction is substantially perpendicular to a plane of the antenna array and a value of about 0° when the transmit beam direction is substantially parallel to the plane of the antenna array.

By controlling the relative phase of the transmit signals provided to the antenna elements 113*a*, 113*b*, a desired transmit beam angle $\theta$ can be achieved. For example, when the first phase shifter 130*a* has a reference value of 0°, the second phase shifter 130*b* can be controlled to provide a phase shift of about $-2\pi f(d/v)\cos\theta$ radians, where f is the fundamental frequency of the transmit signal, d is the distance between the antenna elements, v is the velocity of the radiated wave, and $\pi$ is the mathematic constant pi.

In certain implementations, the distance d is implemented to be about $\frac{1}{2}\lambda$, where $\lambda$ is the wavelength of the fundamental component of the transmit signal. In such implementations, the second phase shifter 130*b* can be controlled to provide a phase shift of about $-\pi\cos\theta$ radians to achieve a transmit beam angle $\theta$.

Accordingly, the relative phase of the phase shifters 130*a*, 130*b* can be controlled to provide transmit beamforming. In certain implementations, a baseband processor and/or a transceiver (for example, the transceiver 105 of FIG. 4A) controls phase values of one or more phase shifters and gain values of one or more controllable amplifiers to control beamforming.

Figure 4C:
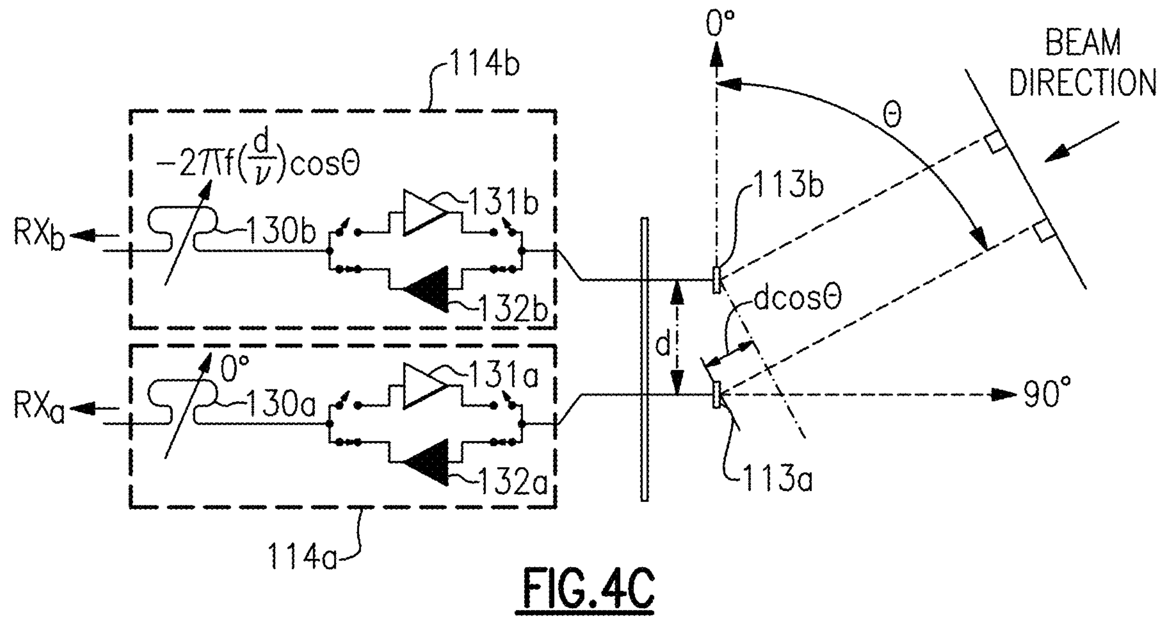
FIG. 4C is a schematic diagram of one example of beamforming to provide a receive beam.

FIG. 4C is a schematic diagram of one example of beamforming to provide a receive beam. FIG. 4C is similar to FIG. 4B, except that FIG. 4C illustrates beamforming in the context of a receive beam rather than a transmit beam.

As shown in FIG. 4C, a relative phase difference between the first phase shifter 130*a* and the second phase shifter 130*b* can be selected to about equal to $-2\pi f(d/v)\cos\theta$ radians to achieve a desired receive beam angle $\theta$. In implementations in which the distance d corresponds to about $\frac{1}{2}\lambda$, the phase difference can be selected to about equal to $-\pi\cos\theta$ radians to achieve a receive beam angle $\theta$.

Although various equations for phase values to provide beamforming have been provided, other phase selection values are possible, such as phase values selected based on implementation of an antenna array, implementation of signal conditioning circuits, and/or a radio environment.

Antenna arrays with separate resonances and termination networks for multiple millimeter wave frequency bands are provided herein. In certain embodiments, an antenna array includes a first antenna element that receives the first radio frequency transmit signal at an input. The first antenna element has a first resonant mode and a second resonant mode. The antenna array further includes a first termination network connected to the input of the first antenna element and a second termination network connected to the input of the first antenna element.

Figure 5A:
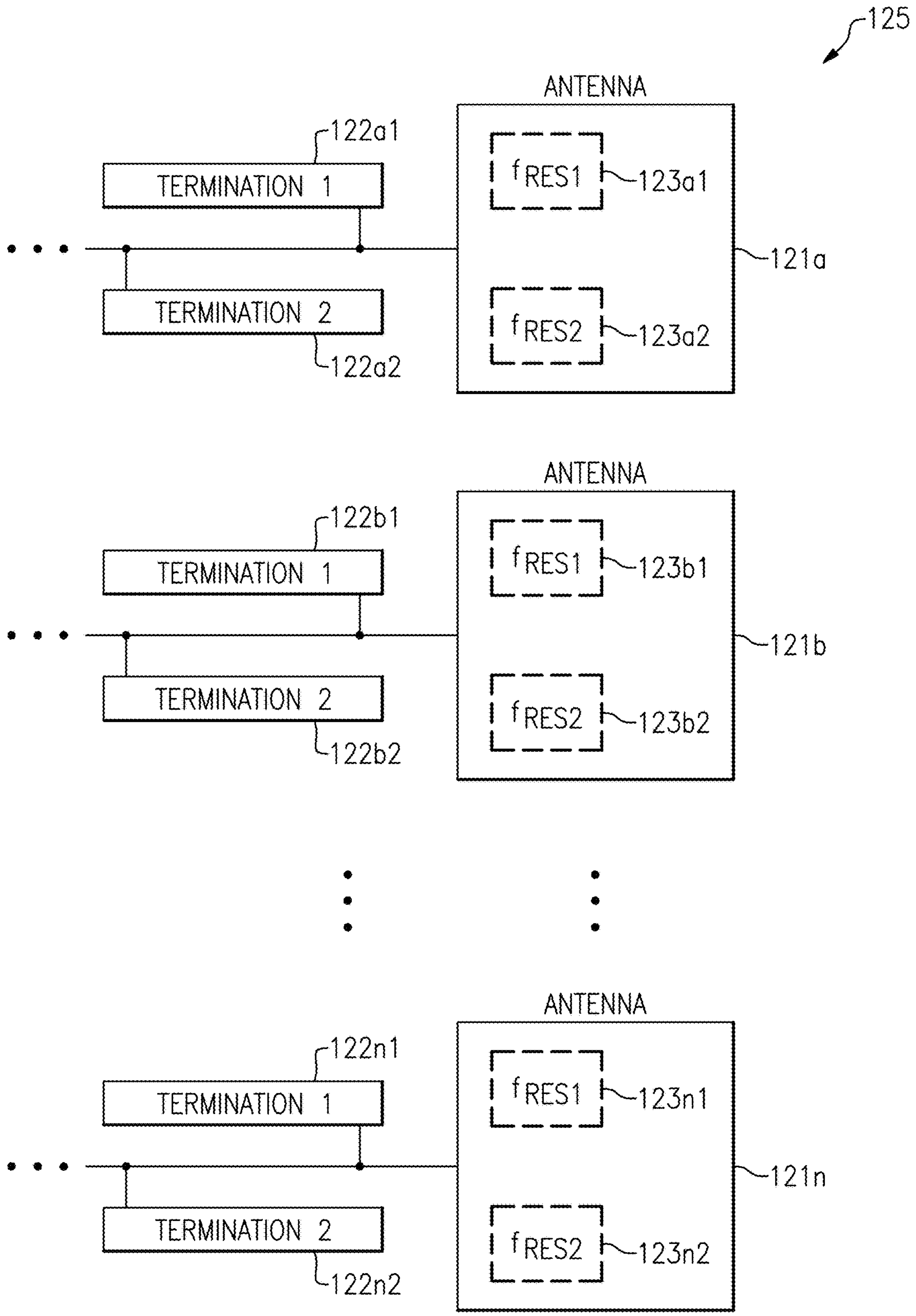
FIG. 5A is a schematic diagram of an antenna array according to one embodiment.

FIG. 5A is a schematic diagram of an antenna array 125 according to one embodiment. The antenna array 125 includes antennas or antenna elements 121*a*, 121*b*, . . . 121*n*, first termination networks 122*a*1, 122*b*1, . . . 122*n*1, and second termination networks 122*a*2, 122*b*2, . . . 122*n*2.

In the illustrated embodiment, the antenna array 125 includes an integer n number of antennas and corresponding pairs of termination networks. The number of antennas n can be any suitable number. Thus, although three antennas are shown, more or fewer antennas can be included as indicated by the ellipsis.

As shown in FIG. 5A, each of the antennas 121*a*, 121*b*, . . . 121*n* is implemented with separate resonant modes (also referred to herein as resonances or resonant frequencies). For example, the antenna 121*a* has a first resonant mode 123*a*1 and a second resonant mode 123*a*2. Additionally, the antenna 121*b* has a first resonant mode 123*b*1 and a second resonant mode 123*b*2, while the antenna 121*n* has a first resonant mode 123*n*1 and a second resonant mode 123*n*2.

In certain implementations, the first resonant mode and the second resonant mode are both in millimeter wave frequency bands and/or FR2 bands. In one example, the first resonant mode is in the 24 GHz frequency band and the second resonant mode is in the 39 GHz frequency band.

As shown in FIG. 5A, each antenna input or signal feed is associated with a first termination network and a separate second termination network. In certain implementations, the first termination network provides termination for the first resonant mode while the second termination network provides termination for the second resonant mode.

In certain implementations, the first termination network and/or the second termination network includes one or more adjustable components to aid in tuning the first termination network to the first resonant mode and/or tuning the second termination network to the second resonant mode.

In certain implementations, a base station and/or user equipment communicates using beamforming. For example, beamforming can be used to focus signal strength to overcome path losses, such as high loss associated with communicating over high signal frequencies. In certain embodiments, beamforming is performed on millimeter wave frequency bands which include 5G FR2. Thus, as used herein a millimeter wave signal can include traditional millimeter waves (30 GHz to 300 GHz) as well as upper centimeter wave frequencies in the range of 24 GHz to 30 GHz.

Figure 5B:
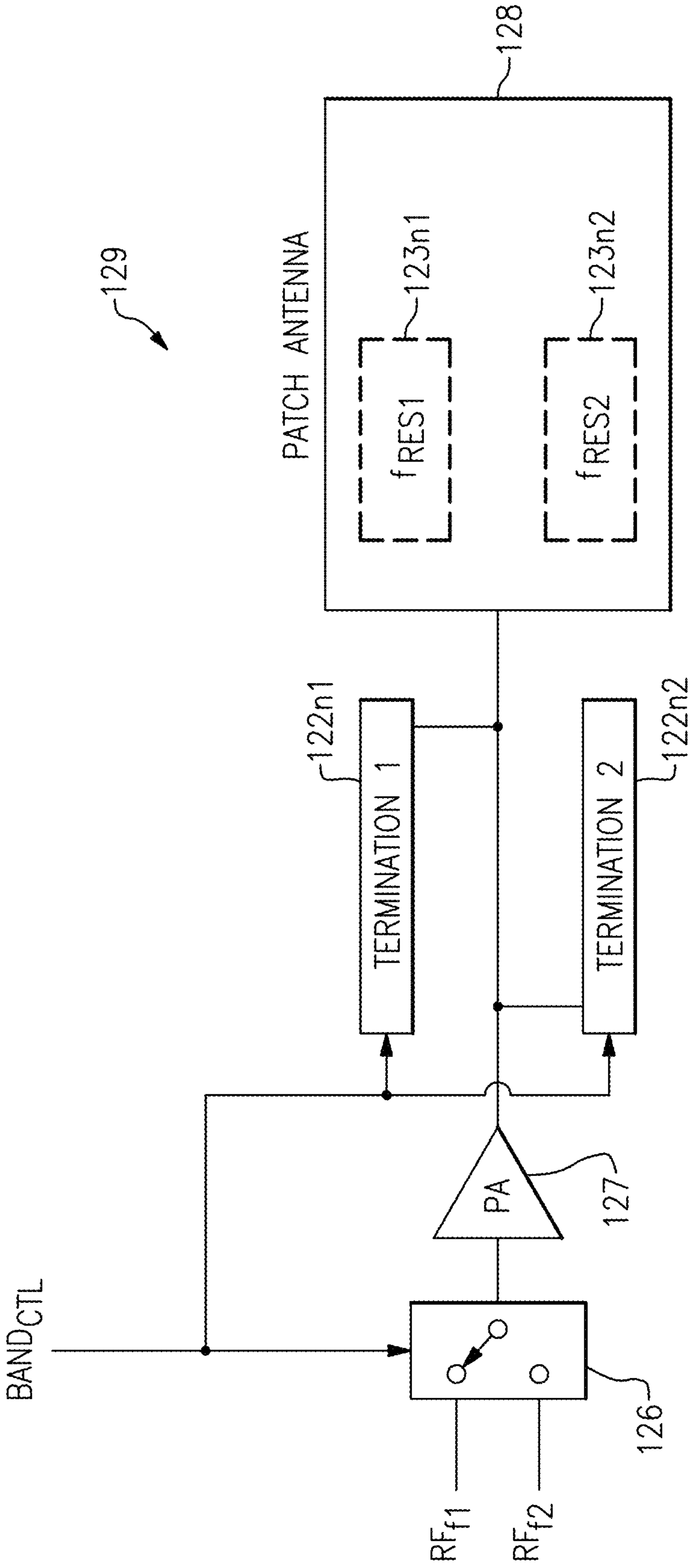
FIG. 5B is a schematic diagram of a power amplifier system according to one embodiment.

FIG. 5B is a schematic diagram of a power amplifier system 129 according to one embodiment. The power amplifier system 129 includes a band switch 126, a power amplifier system 127 and a port of an antenna array that includes a patch antenna 128, a first adjustable termination network **122*n*1, and a second adjustable termination network 122*n*2**.

Although the power amplifier system 129 is depicted as including one power amplifier and one antenna, additional power amplifiers and/or antennas can be included. For example, the power amplifier system 129 can correspond to one channel of a larger system, with the patch antenna 128 corresponding to one antenna element of a larger array.

In the illustrated embodiment, the band switch 126 selectively provides the power amplifier 127 with one of a first RF signal $RF_{f1}$ of a first millimeter frequency band or a second RF signal $RF_{f2}$ of a second millimeter wave frequency band. Additionally, the power amplifier 127 amplifies the selected RF signal to generate an amplified RF signal that is provided to the patch antenna 128 for transmission. In certain implementations, the first RF signal $RF_{f1}$ and the second RF signal $RF_{f2}$ are generated by a transceiver.

As shown in FIG. 5B, the first adjustable termination network **122*n*1 and the second adjustable termination network 122*n*2 are both adjustable based on the selected frequency, for example, using a band control signal $BAND_{CTL}$ used to control the band switch 126. However, other implementations of adjustability are possible, such as configurations in which separate control signals are provided tot eh first adjustable termination network 122*n*1 and the second adjustable termination network 122*n*2**. Providing adjustability (for example, by providing controllable impedance components) can aid in tuning the first termination network to the first resonant mode and/or tuning the second termination network to the second resonant mode.

In the illustrated embodiment, the patch antenna 128 has a first resonant mode **123*n*1 and a second resonant mode 123*n*2**.

Figure 6A:
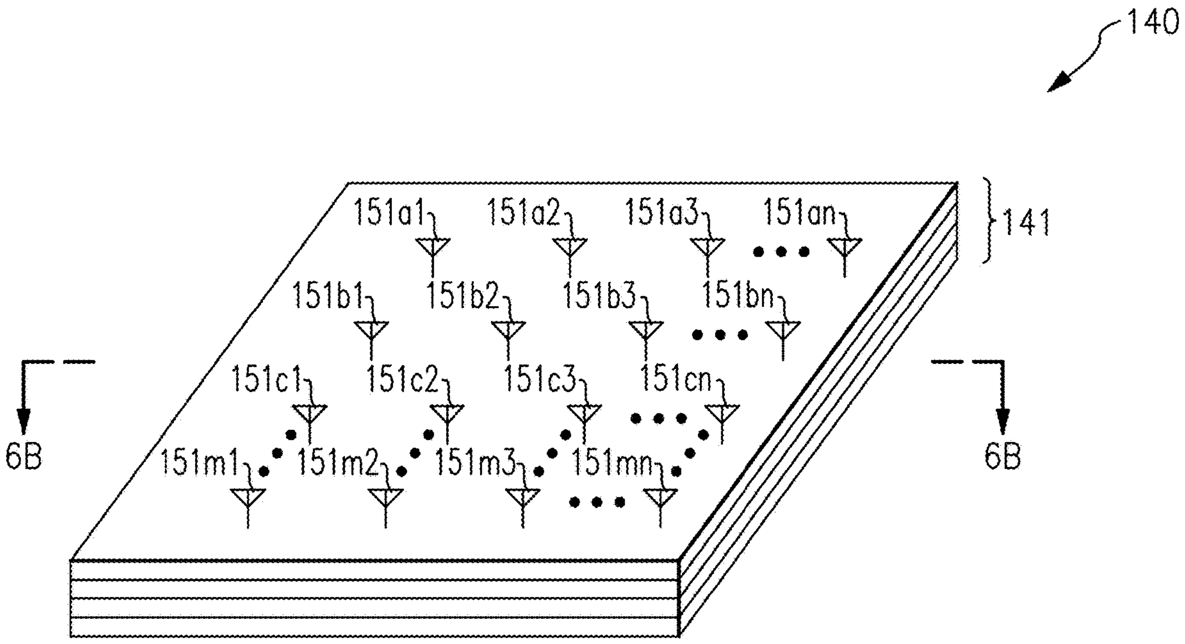
FIG. 6A is a perspective view of one embodiment of a module that operates with beamforming.
Figure 6B:
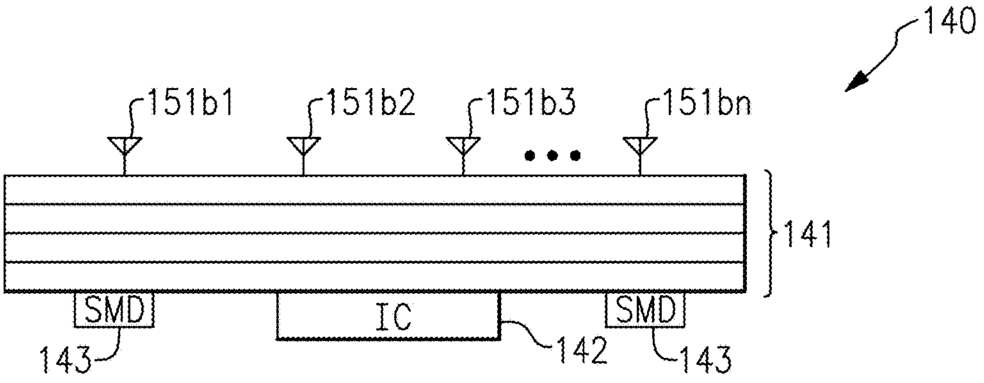
FIG. 6B is a cross-section of the module of FIG. 6A taken along the lines 6B-6B.

FIG. 6A is a perspective view of one embodiment of a module 140 that operates with beamforming. FIG. 6B is a cross-section of the module 140 of FIG. 6A taken along the lines 6B-6B.

The module 140 includes a laminated substrate or laminate 141, a semiconductor die or IC 142 (not visible in FIG. 6A), surface mount devices (SMDs) 143 (not visible in FIG. 6A), and an antenna array including antenna elements **151*a*1, 151*a*2, 151*a*3 . . . 151*an*, 151*b*1, 151*b*2, 151*b*3 . . . 151*bn*, 151*c*1, 151*c*2, 151*c*3 . . . 151*cn*, 151*m*1, 151*m*2, 151*m*3 . . . 151*mn***.

Although one embodiment of a module is shown in FIGS. 6A and 6B, the teachings herein are applicable to modules implemented in a wide variety of ways. For example, a module can include a different arrangement of and/or number of antenna elements, dies, and/or surface mount devices. Additionally, the module 140 can include additional structures and components including, but not limited to, encapsulation structures, shielding structures, and/or wirebonds.

The antenna elements antenna elements **151*a*1, 151*a*2, 151*a*3 . . . 151*an*, 151*b*1, 151*b*2, 151*b*3 . . . 151*bn*, 151*c*1, 151*c*2, 151*c*3 . . . 151*cn*, 151*m*1, 151*m*2, 151*m*3 . . . 151*mn* are formed on a first surface of the laminate 141**, and can be used to receive and/or transmit signals, based on implementation. Although a 4×4 array of antenna elements is shown, more or fewer antenna elements are possible as indicated by ellipses. Moreover, antenna elements can be arrayed in other patterns or configurations, including, for instance, arrays using non-uniform arrangements of antenna elements. Furthermore, in another embodiment, multiple antenna arrays are provided, such as separate antenna arrays for transmit and receive and/or for different communication bands.

In the illustrated embodiment, the IC 142 is on a second surface of the laminate 141 opposite the first surface. However, other implementations are possible. In one example, the IC 142 is integrated internally to the laminate 141.

In certain implementations, the IC 142 includes signal conditioning circuits associated with the antenna elements **151*a*1, 151*a*2, 151*a*3 . . . 151*an*, 151*b*1, 151*b*2, 151*b*3 . . . 151*bn*, 151*c*1, 151*c*2, 151*c*3 . . . 151*cn*, 151*m*1, 151*m*2, 151*m*3 . . . 151*mn*. In one embodiment, the IC 142 includes a serial interface, such as a mobile industry processor interface radio frequency front-end (MIPI RFFE) bus and/or inter-integrated circuit (I2C) bus that receives data for controlling the signal conditioning circuits, such as the amount of phase shifting provided by phase shifters. In another embodiment, the IC 142 includes signal conditioning circuits associated with the antenna elements 151*a*1, 151*a*2, 151*a*3 . . . 151*an*, 151*b*1, 151*b*2, 151*b*3 . . . 151*bn*, 151*c*1, 151*c*2, 151*c*3 . . . 151*cn*, 151*m*1, 151*m*2, 151*m*3 . . . 151*mn*** and an integrated transceiver.

The laminate 141 can include various structures including, for example, conductive layers, dielectric layers, and/or solder masks. The number of layers, layer thicknesses, and materials used to form the layers can be selected based on a wide variety of factors, and can vary with application and/or implementation. The laminate 141 can include vias for providing electrical connections to signal feeds and/or ground feeds of the antenna elements. For example, in certain implementations, vias can aid in providing electrical connections between signal conditioning circuits of the IC 142 and corresponding antenna elements.

The antenna elements **151*a*1, 151*a*2, 151*a*3 . . . 151*an*, 151*b*1, 151*b*2, 151*b*3 . . . 151*bn*, 151*c*1, 151*c*2, 151*c*3 . . . 151*cn*, 151*m*1, 151*m*2, 151*m*3 . . . 151*mn* can correspond to antenna elements implemented in a wide variety of ways. In one example, the array of antenna elements includes patch antenna element formed from a patterned conductive layer on the first side of the laminate 141, with a ground plane formed using a conductive layer on opposing side of the laminate 141 or internal to the laminate 141**. Other examples of antenna elements include, but are not limited to, dipole antenna elements, ceramic resonators, stamped metal antennas, and/or laser direct structuring antennas.

The module 140 can be included in a communication system, such as a mobile phone or base station. In one example, the module 140 is attached to a phone board of a mobile phone.

Figure 7:
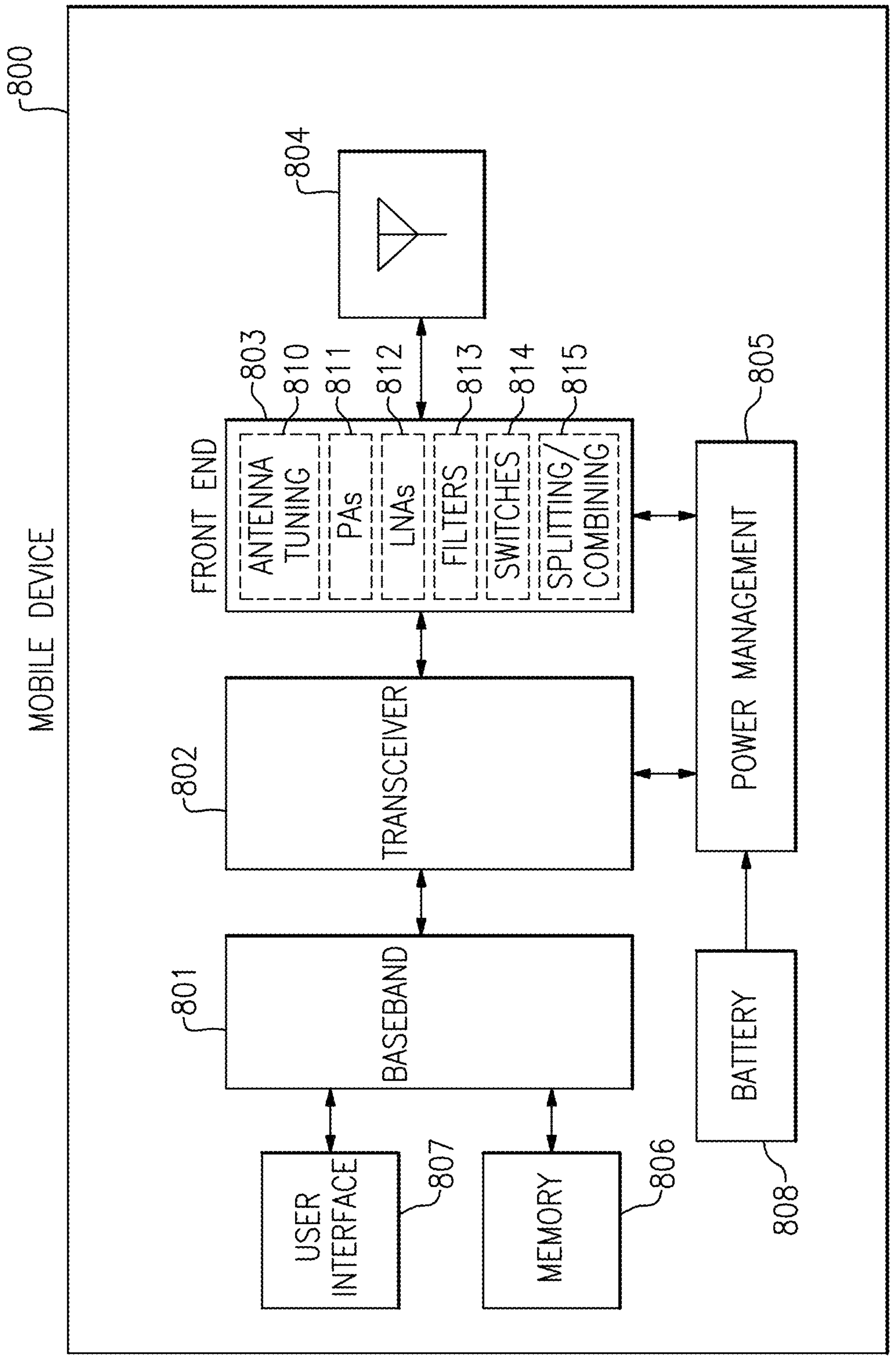
FIG. 7 is a schematic diagram of one embodiment of a mobile device.

FIG. 7 is a schematic diagram of one embodiment of a mobile device 800. The mobile device 800 includes a baseband system 801, a transceiver 802, a front end system 803, antennas 804, a power management system 805, a memory 806, a user interface 807, and a battery 808.

The mobile device 800 can be used communicate using a wide variety of communications technologies, including, but not limited to, 2G, 3G, 4G (including LTE, LTE-Advanced, and LTE-Advanced Pro), 5G NR, WLAN (for instance, WiFi), WPAN (for instance, Bluetooth and ZigBee), WMAN (for instance, WiMax), and/or GPS technologies.

The transceiver 802 generates RF signals for transmission and processes incoming RF signals received from the antennas 804. It will be understood that various functionalities associated with the transmission and receiving of RF signals can be achieved by one or more components that are collectively represented in FIG. 7 as the transceiver 802. In one example, separate components (for instance, separate circuits or dies) can be provided for handling certain types of RF signals.

The front end system 803 aids in conditioning signals transmitted to and/or received from the antennas 804. In the illustrated embodiment, the front end system 803 includes antenna tuning circuitry 810, power amplifiers (PAs) 811, low noise amplifiers (LNAs) 812, filters 813, switches 814, and signal splitting/combining circuitry 815. However, other implementations are possible.

For example, the front end system 803 can provide a number of functionalities, including, but not limited to, amplifying signals for transmission, amplifying received signals, filtering signals, switching between different bands, switching between different power modes, switching between transmission and receiving modes, duplexing of signals, multiplexing of signals (for instance, diplexing or triplexing), or some combination thereof.

In certain implementations, the mobile device 800 supports carrier aggregation, thereby providing flexibility to increase peak data rates. Carrier aggregation can be used for both Frequency Division Duplexing (FDD) and Time Division Duplexing (TDD), and may be used to aggregate a plurality of carriers or channels. Carrier aggregation includes contiguous aggregation, in which contiguous carriers within the same operating frequency band are aggregated. Carrier aggregation can also be non-contiguous, and can include carriers separated in frequency within a common band or in different bands.

The antennas 804 can include antennas used for a wide variety of types of communications. For example, the antennas 804 can include antennas for transmitting and/or receiving signals associated with a wide variety of frequencies and communications standards.

In certain implementations, the antennas 804 support MIMO communications and/or switched diversity communications. For example, MIMO communications use multiple antennas for communicating multiple data streams over a single radio frequency channel. MIMO communications benefit from higher signal to noise ratio, improved coding, and/or reduced signal interference due to spatial multiplexing differences of the radio environment. Switched diversity refers to communications in which a particular antenna is selected for operation at a particular time. For example, a switch can be used to select a particular antenna from a group of antennas based on a variety of factors, such as an observed bit error rate and/or a signal strength indicator.

The mobile device 800 can operate with beamforming in certain implementations. For example, the front end system 803 can include amplifiers having controllable gain and phase shifters having controllable phase to provide beam formation and directivity for transmission and/or reception of signals using the antennas 804. For example, in the context of signal transmission, the amplitude and phases of the transmit signals provided to the antennas 804 are controlled such that radiated signals from the antennas 804 combine using constructive and destructive interference to generate an aggregate transmit signal exhibiting beam-like qualities with more signal strength propagating in a given direction. In the context of signal reception, the amplitude and phases are controlled such that more signal energy is received when the signal is arriving to the antennas 804 from a particular direction. In certain implementations, the antennas 804 include one or more arrays of antenna elements to enhance beamforming.

The baseband system 801 is coupled to the user interface 807 to facilitate processing of various user input and output (I/O), such as voice and data. The baseband system 801 provides the transceiver 802 with digital representations of transmit signals, which the transceiver 802 processes to generate RF signals for transmission. The baseband system 801 also processes digital representations of received signals provided by the transceiver 802. As shown in FIG. 7, the baseband system 801 is coupled to the memory 806 of facilitate operation of the mobile device 800.

The memory 806 can be used for a wide variety of purposes, such as storing data and/or instructions to facilitate the operation of the mobile device 800 and/or to provide storage of user information.

The power management system 805 provides a number of power management functions of the mobile device 800. In certain implementations, the power management system 805 includes a PA supply control circuit that controls the supply voltages of the power amplifiers 811. For example, the power management system 805 can be configured to change the supply voltage(s) provided to one or more of the power amplifiers 811 to improve efficiency, such as power added efficiency (PAE).

As shown in FIG. 7, the power management system 805 receives a battery voltage from the battery 808. The battery 808 can be any suitable battery for use in the mobile device 800, including, for example, a lithium-ion battery.

Figure 8A:
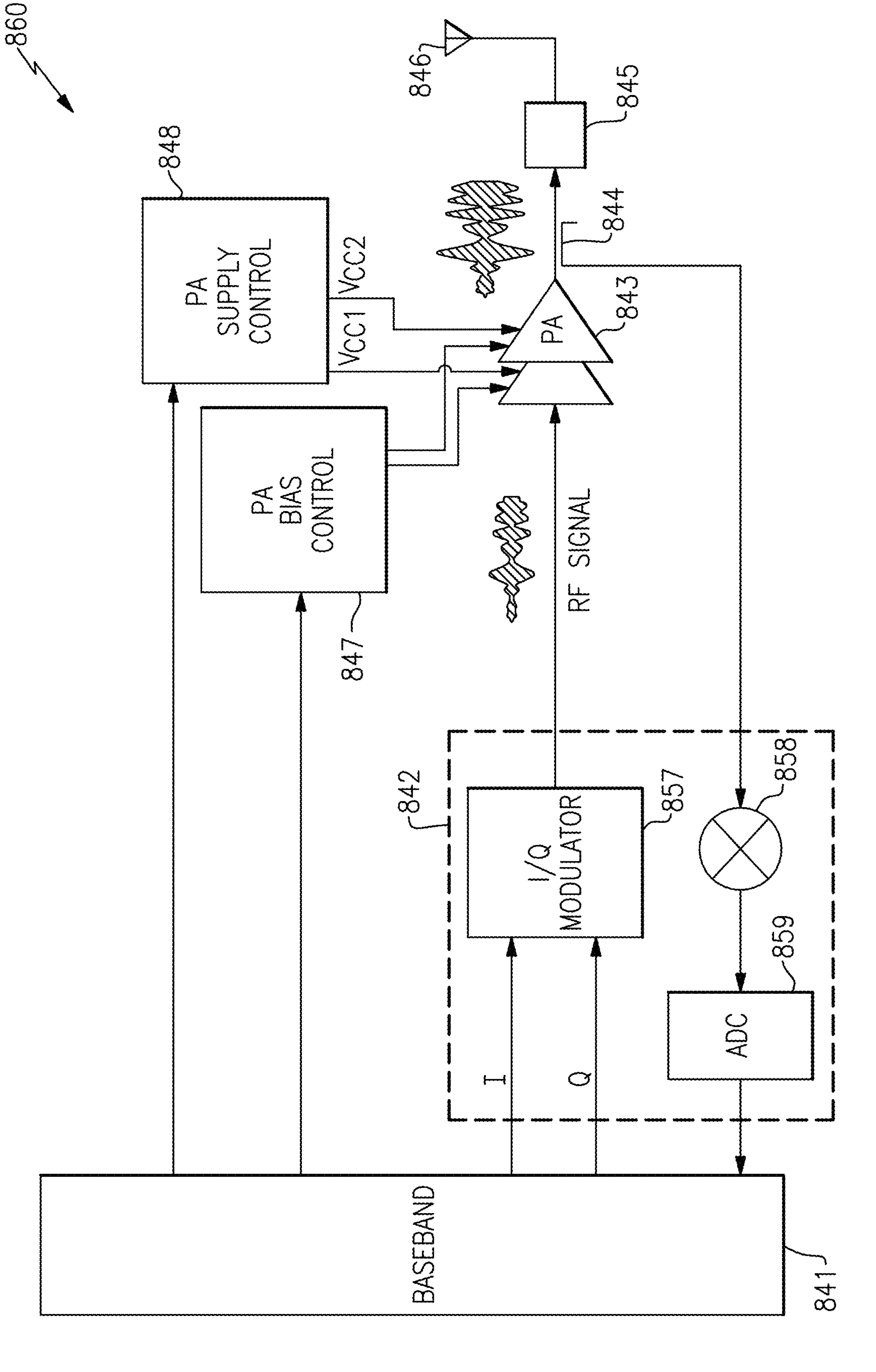
FIG. 8A is a schematic diagram of a power amplifier system according to another embodiment.

FIG. 8A is a schematic diagram of a power amplifier system 860 according to another embodiment. The illustrated power amplifier system 860 includes a baseband processor 841, a transmitter/observation receiver 842, a power amplifier (PA) 843, a directional coupler 844, front-end circuitry 845, an antenna 846, a PA bias control circuit 847, and a PA supply control circuit 848. The illustrated transmitter/observation receiver 842 includes an I/Q modulator 857, a mixer 858, and an analog-to-digital converter (ADC) 859. In certain implementations, the transmitter/observation receiver 842 is incorporated into a transceiver.

The baseband processor 841 can be used to generate an in-phase (I) signal and a quadrature-phase (Q) signal, which can be used to represent a sinusoidal wave or signal of a desired amplitude, frequency, and phase. For example, the I signal can be used to represent an in-phase component of the sinusoidal wave and the Q signal can be used to represent a quadrature-phase component of the sinusoidal wave, which can be an equivalent representation of the sinusoidal wave. In certain implementations, the I and Q signals can be provided to the I/Q modulator 857 in a digital format. The baseband processor 841 can be any suitable processor configured to process a baseband signal. For instance, the baseband processor 841 can include a digital signal processor, a microprocessor, a programmable core, or any combination thereof. Moreover, in some implementations, two or more baseband processors 841 can be included in the power amplifier system 860.

The I/Q modulator 857 can be configured to receive the I and Q signals from the baseband processor 841 and to process the I and Q signals to generate an RF signal. For example, the I/Q modulator 857 can include digital-to-analog converters (DACs) configured to convert the I and Q signals into an analog format, mixers for upconverting the I and Q signals to RF, and a signal combiner for combining the upconverted I and Q signals into an RF signal suitable for amplification by the power amplifier 843. In certain implementations, the I/Q modulator 857 can include one or more filters configured to filter frequency content of signals processed therein.

The power amplifier 843 can receive the RF signal from the I/Q modulator 857, and when enabled can provide an amplified RF signal to the antenna 846 via the front-end circuitry 845.

The front-end circuitry 845 can be implemented in a wide variety of ways. In one example, the front-end circuitry 845 includes one or more switches, filters, duplexers, multiplexers, and/or other components. In another example, the front-end circuitry 845 is omitted in favor of the power amplifier 843 providing the amplified RF signal directly to the antenna 846.

The directional coupler 844 senses an output signal of the power amplifier 823. Additionally, the sensed output signal from the directional coupler 844 is provided to the mixer 858, which multiplies the sensed output signal by a reference signal of a controlled frequency. The mixer 858 operates to generate a downshifted signal by downshifting the sensed output signal's frequency content. The downshifted signal can be provided to the ADC 859, which can convert the downshifted signal to a digital format suitable for processing by the baseband processor 841. Including a feedback path from the output of the power amplifier 843 to the baseband processor 841 can provide a number of advantages. For example, implementing the baseband processor 841 in this manner can aid in providing power control, compensating for transmitter impairments, and/or in performing digital pre-distortion (DPD). Although one example of a sensing path for a power amplifier is shown, other implementations are possible.

The PA supply control circuit 848 receives a power control signal from the baseband processor 841, and controls supply voltages of the power amplifier 843. In the illustrated configuration, the PA supply control circuit 848 generates a first supply voltage $V_{CC1}$ for powering an input stage of the power amplifier 843 and a second supply voltage $V_{CC2}$ for powering an output stage of the power amplifier 843. The PA supply control circuit 848 can control the voltage level of the first supply voltage $V_{CC1}$ and/or the second supply voltage $V_{CC2}$ to enhance the power amplifier system's PAE.

The PA supply control circuit 848 can employ various power management techniques to change the voltage level of one or more of the supply voltages over time to improve the power amplifier's power added efficiency (PAE), thereby reducing power dissipation.

One technique for improving efficiency of a power amplifier is average power tracking (APT), in which a DC-to-DC converter is used to generate a supply voltage for a power amplifier based on the power amplifier's average output power. Another technique for improving efficiency of a power amplifier is envelope tracking (ET), in which a supply voltage of the power amplifier is controlled in relation to the envelope of the RF signal. Thus, when a voltage level of the envelope of the RF signal increases the voltage level of the power amplifier's supply voltage can be increased. Likewise, when the voltage level of the envelope of the RF signal decreases the voltage level of the power amplifier's supply voltage can be decreased to reduce power consumption.

In certain configurations, the PA supply control circuit 848 is a multi-mode supply control circuit that can operate in multiple supply control modes including an APT mode and an ET mode. For example, the power control signal from the baseband processor 841 can instruct the PA supply control circuit 848 to operate in a particular supply control mode.

As shown in FIG. 8A, the PA bias control circuit 847 receives a bias control signal from the baseband processor 841, and generates bias control signals for the power amplifier 843. In the illustrated configuration, the bias control circuit 847 generates bias control signals for both an input stage of the power amplifier 843 and an output stage of the power amplifier 843. However, other implementations are possible.

Figure 8B:
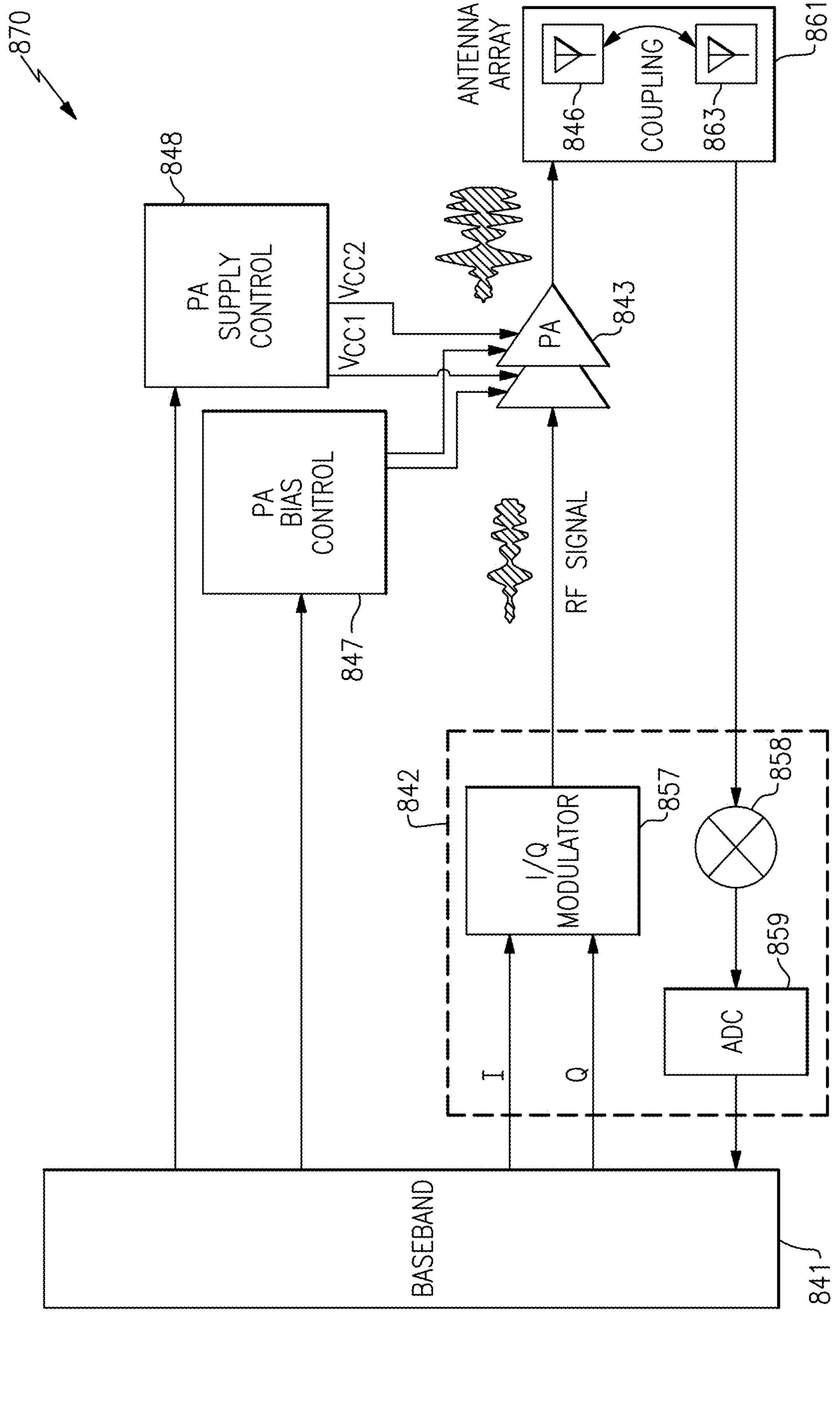
FIG. 8B is a schematic diagram of a power amplifier system according to another embodiment.

FIG. 8B is a schematic diagram of a power amplifier system 870 according to another embodiment. The illustrated power amplifier system 870 includes a baseband processor 841, a transmitter/observation receiver 842, a power amplifier 843, an antenna array 861, a PA bias control circuit 847, and a PA supply control circuit 848. As shown in FIG. 8B, the antenna array 861 includes an antenna 861 and an observation antenna 863.

The power amplifier system 870 of FIG. 8B is similar to the power amplifier system 860 of FIG. 8A, except that the power amplifier system 870 omits the directional coupler 844 and the front-end circuitry 845 of FIG. 8A to avoid loading loss at the output of the power amplifier 843. For example, the power amplifier system 870 can aid in providing low signal loss when transmitting at millimeter wave frequencies. As shown in FIG. 8B, the observation antenna 863 is coupled to the antenna 861 by antenna-to-antenna coupling, and serves to provide an observation signal for the observation path of the transmitter/observation receiver 842.

Figure 9A:
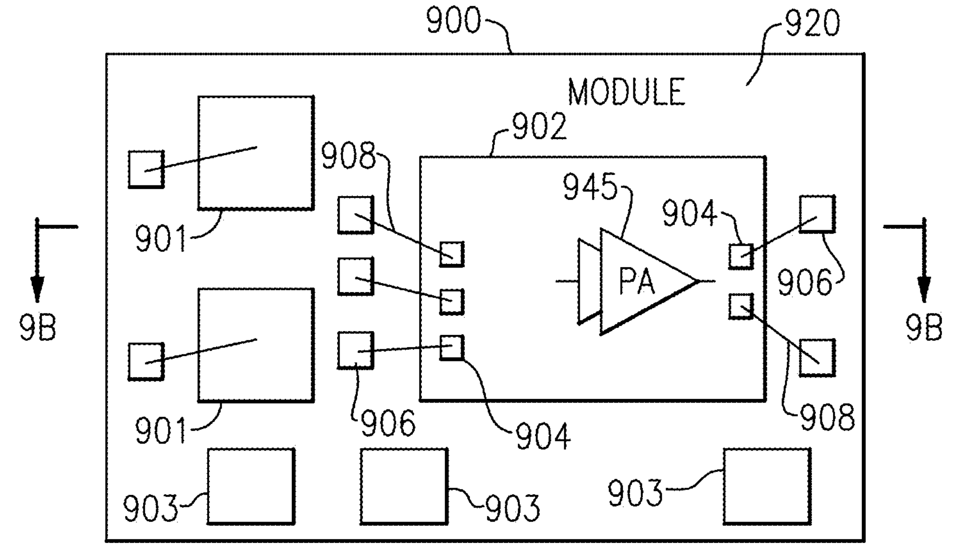
FIG. 9A is a schematic diagram of one embodiment of a packaged module.
Figure 9B:
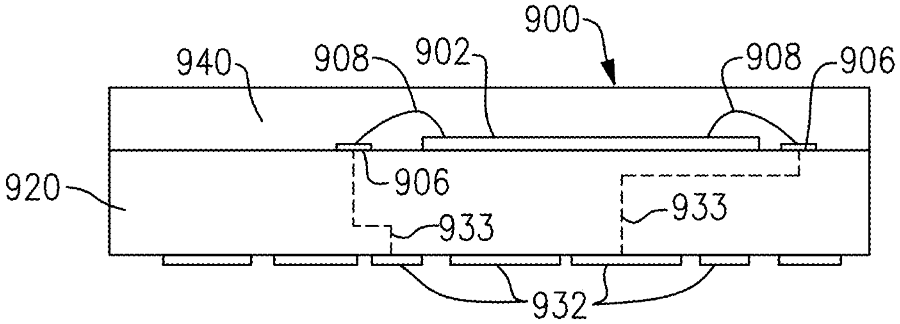
FIG. 9B is a schematic diagram of a cross-section of the packaged module of FIG. 9A taken along the lines 9B-9B.

FIG. 9A is a schematic diagram of one embodiment of a packaged module 900. FIG. 9B is a schematic diagram of a cross-section of the packaged module 900 of FIG. 9A taken along the lines 9B-9B.

The packaged module 900 includes radio frequency components 901, a semiconductor die 902, surface mount devices 903, wirebonds 908, a package substrate 920, and an encapsulation structure 940. The package substrate 920 includes pads 906 formed from conductors disposed therein. Additionally, the semiconductor die 902 includes pins or pads 904, and the wirebonds 908 have been used to connect the pads 904 of the die 902 to the pads 906 of the package substrate 920.

The semiconductor die 902 includes a power amplifier 945, which can be implemented in accordance with one or more features disclosed herein.

The packaging substrate 920 can be configured to receive a plurality of components such as radio frequency components 901, the semiconductor die 902 and the surface mount devices 903, which can include, for example, surface mount capacitors and/or inductors. In one implementation, the radio frequency components 901 include integrated passive devices (IPDs).

As shown in FIG. 9B, the packaged module 900 is shown to include a plurality of contact pads 932 disposed on the side of the packaged module 900 opposite the side used to mount the semiconductor die 902. Configuring the packaged module 900 in this manner can aid in connecting the packaged module 900 to a circuit board, such as a phone board of a mobile device. The example contact pads 932 can be configured to provide radio frequency signals, bias signals, and/or power (for example, a power supply voltage and ground) to the semiconductor die 902 and/or other components. As shown in FIG. 9B, the electrical connections between the contact pads 932 and the semiconductor die 902 can be facilitated by connections 933 through the package substrate 920. The connections 933 can represent electrical paths formed through the package substrate 920, such as connections associated with vias and conductors of a multilayer laminated package substrate.

In some embodiments, the packaged module 900 can also include one or more packaging structures to, for example, provide protection and/or facilitate handling. Such a packaging structure can include overmold or encapsulation structure 940 formed over the packaging substrate 920 and the components and die(s) disposed thereon.

It will be understood that although the packaged module 900 is described in the context of electrical connections based on wirebonds, one or more features of the present disclosure can also be implemented in other packaging configurations, including, for example, flip-chip configurations.

Figure 10A:
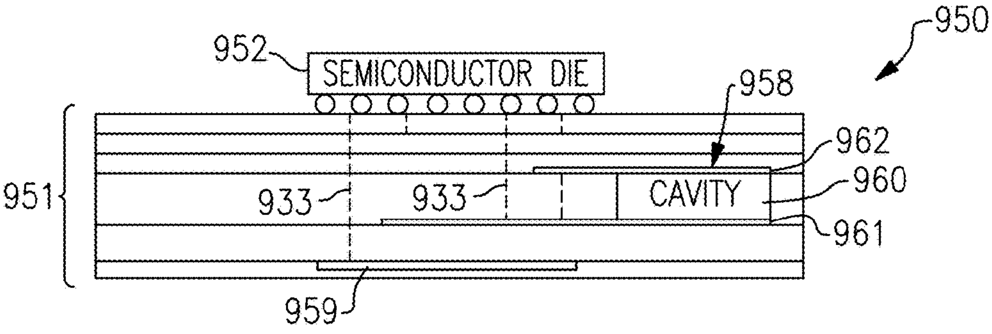
FIG. 10A is a schematic diagram of a cross-section of another embodiment of a packaged module.

FIG. 10A is a schematic diagram of a cross-section of another embodiment of a packaged module 950. The packaged module 950 includes a laminated package substrate 951 and a flip-chip die 952.

The laminated package substrate 951 includes a cavity-based antenna 958 associated with an air cavity 960, a first conductor 961, a second conductor 962. The laminated package substrate 951 further includes a planar antenna 959.

In certain implementations herein, a packaged module includes one or more integrated antennas. For example, the packaged module 950 of FIG. 10A includes the cavity-based antenna 958 and the planar antenna 959. By including antennas facing in multiple directions (including, but not limited to, directions that are substantially perpendicular to one another), a range of available angles for communications can be increased. Although one example of a packaged module with integrated antennas is shown, the teachings herein are applicable to modules implemented in a wide variety of ways.

Figure 10B:
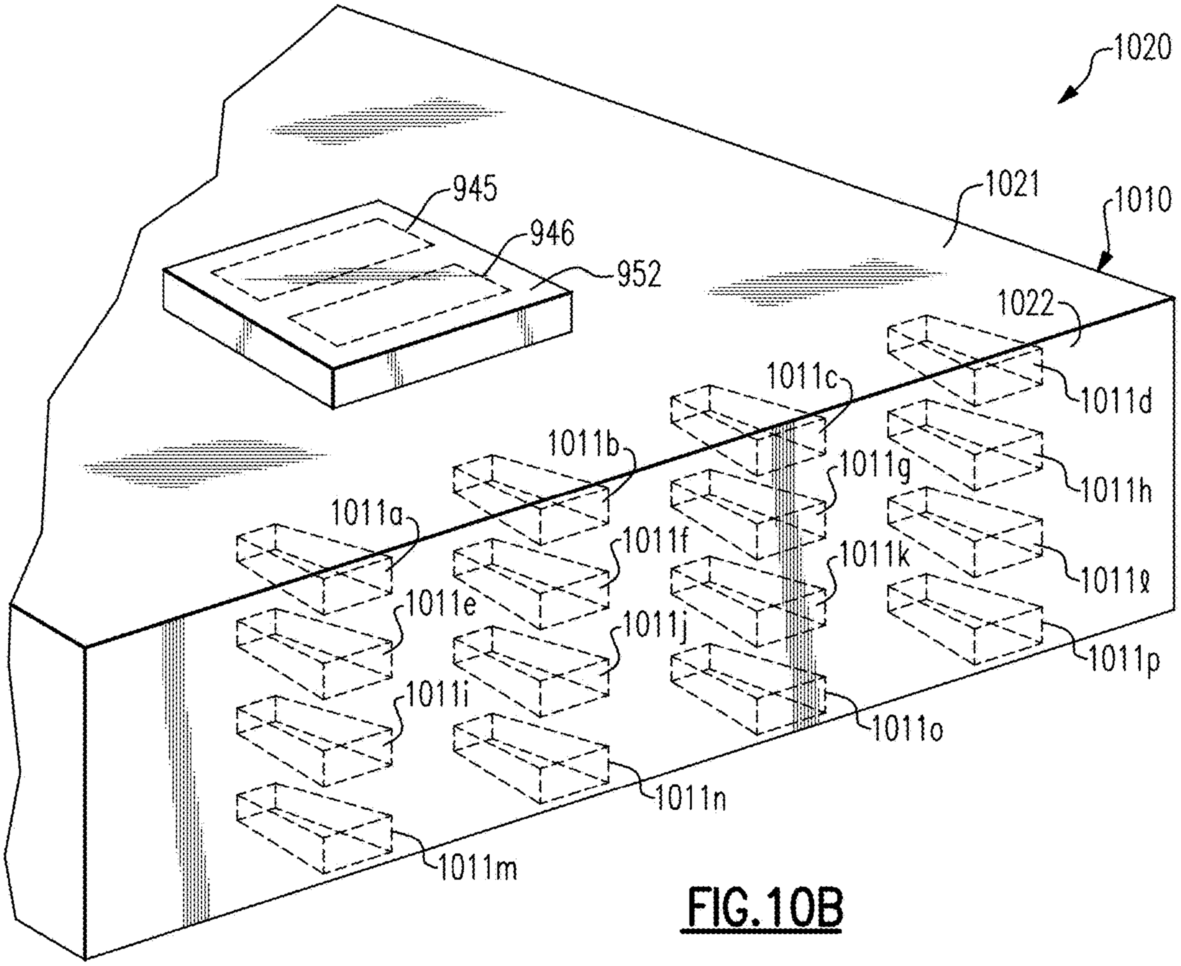
FIG. 10B is a perspective view of another embodiment of a packaged module.

FIG. 10B is a perspective view of another embodiment of a packaged module 1020. The module 1020 includes a laminated substrate 1010 and a semiconductor die 1012. The semiconductor die 1012 includes at least one of a front end system 945 or a transceiver 946. For example, the front end system 945 can include signal conditioning circuits, such as controllable amplifiers and/or controllable phase shifters, to aid in providing beamforming.

In the illustrated the embodiment, cavity-based antennas 1011*a*-1011*p* have been formed on an edge 1022 of the laminated substrate 1010. In this example, sixteen cavity-based antennas have been provided in a four-by-four (4×4) array. However, more or fewer antennas can be included and/or antennas can be arrayed in other patterns.

In another embodiment, the laminated substrate 1010 further include another antenna array (for example, a patch antenna array) formed on a second major surface of the laminated substrate 1010 opposite the first major surface 1021. Implementing the module 1020 aids in increasing a range of angles over which the module 1020 can communicate.

The module 1020 illustrates another embodiment of a module including an array of antennas that are controllable to provide beamforming. Implementing an array of antennas on a side of module aids in communicating at certain angles and/or directions that may otherwise be unavailable due to environmental blockage. Although an example with cavity-based antennas is shown, the teachings herein are applicable to implementations using other types of antennas.

Figure 11:
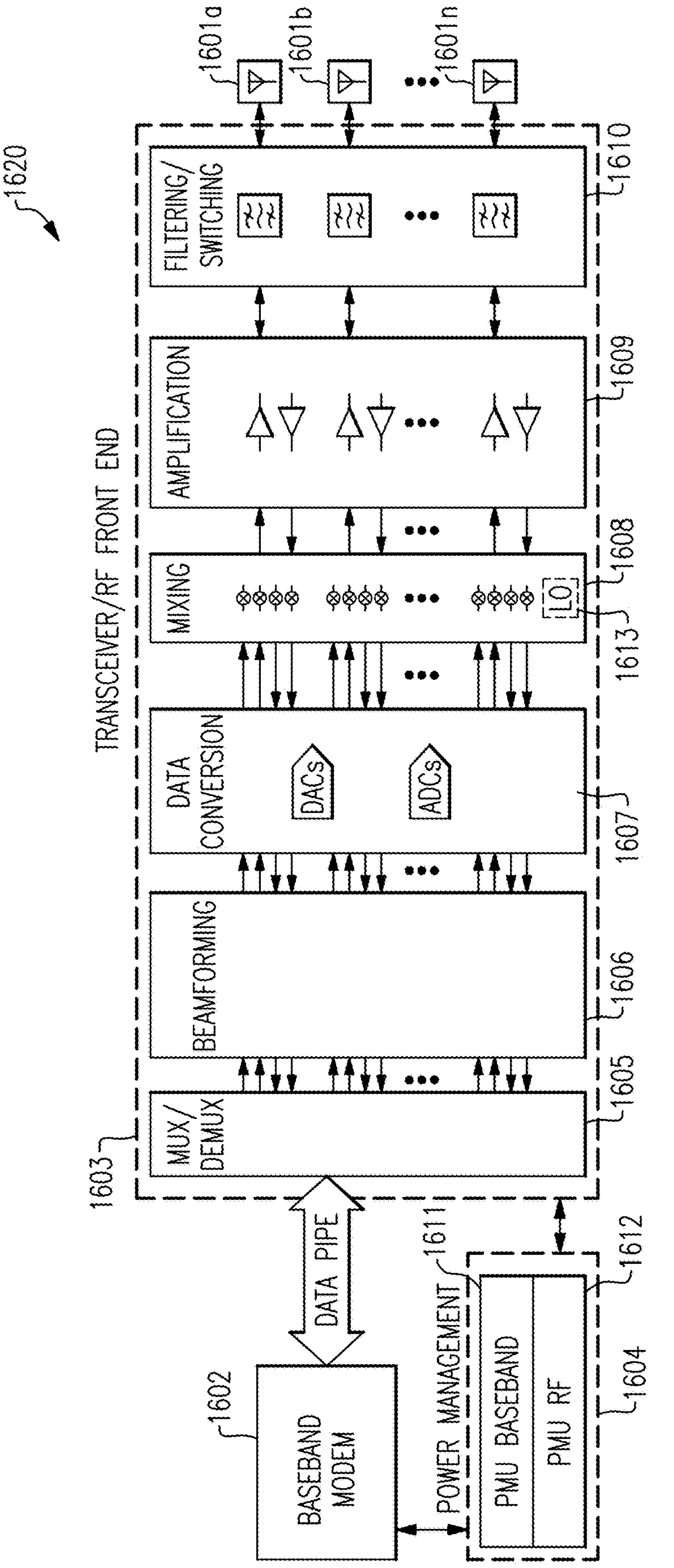
FIG. 11 is a schematic diagram of another embodiment of a mobile device.

FIG. 11 is a schematic diagram of another embodiment of a mobile device 1620. The mobile device 1620 includes an antenna array including antennas 1601*a*, 1601*b*, . . . 1601*n*, a baseband modem 1602, a transceiver/RF front end 1603, and a power management system 1604.

Although one embodiment of a mobile device 1620 is depicted, the teachings herein are applicable to mobile devices implemented in other ways.

In the illustrated embodiment, the transceiver/RF front end 1603 includes a multiplexing/de-multiplexing circuit 1605, a digital processing and beamforming circuit 1606, a data conversion circuit 1607, a mixing circuit 1608, an amplification circuit 1609, and a filtering/switching circuit 1610.

As shown in FIG. 11, the multiplexing/de-multiplexing circuit 1605 is connected to the baseband modem 1602 over a data pipe. The multiplexing/de-multiplexing circuit 1605 is also connected to the digital processing and beamforming circuit 1606, which digitally processes digital transmit and receive data to perform a variety of functions, such a digital pre-distortion (DPD) and beamforming. Thus, beamforming is performed at least in part using digital processing, in the embodiment.

With continuing reference to FIG. 11, the data conversion circuit 1607 includes analog-to-digital converters (ADCs) for converting analog receive signals to digital receive data, and digital-to-analog converters (DACs) for converting digital transmit data to analog transmit signals. The mixing circuit 1608 includes mixers for upconverting the analog transmit signals to generate RF transmit signals and downconverters for down converting RF receive signals to generate the analog receive signals. The mixing circuit 1608 includes at least one local oscillator (LO) 1613 for providing clock signals used for frequency conversion.

The mobile device 1620 also includes the filtering/switching circuit 1610 for filtering the RF receive signals and/or RF transmit signals and for controlling connectivity to the antenna elements 1601*a*, 1601*b*, . . . 1601*n*.

As shown in FIG. 11, the power management system 1604 includes a baseband power management unit (PMU) 1611 coupled to the baseband modem 1602 and an RF PMU 1612 coupled to the transceiver/RF front end 1603. The RF PMU 1612 can provide a wide variety of power management schemes for the transceiver/RF front end 1603 including, but not limited to, power management of the amplification circuit 1609.

Applications

Some of the embodiments described above have provided examples in connection with wireless devices or mobile phones. However, the principles and advantages of the embodiments can be used for any other systems or apparatus that have needs for antenna arrays.

Such antenna arrays can be implemented in various electronic devices. Examples of the electronic devices can include, but are not limited to, consumer electronic products, parts of the consumer electronic products, electronic test equipment, etc. Examples of the electronic devices can also include, but are not limited to, memory chips, memory modules, circuits of optical networks or other communication networks, and disk driver circuits. The consumer electronic products can include, but are not limited to, a mobile phone, a telephone, a television, a computer monitor, a computer, a hand-held computer, a personal digital assistant (PDA), a microwave, a refrigerator, an automobile, a stereo system, a cassette recorder or player, a DVD player, a CD player, a VCR, an MP3 player, a radio, a camcorder, a camera, a digital camera, a portable memory chip, a washer, a dryer, a washer/dryer, a copier, a facsimile machine, a scanner, a multi-functional peripheral device, a wrist watch, a clock, etc. Further, the electronic devices can include unfinished products.

CONCLUSION

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." The word "coupled", as generally used herein, refers to two or more elements that may be either directly connected, or connected by way of one or more intermediate elements. Likewise, the word "connected", as generally used herein, refers to two or more elements that may be either directly connected, or connected by way of one or more intermediate elements. Additionally, the words "herein," "above," "below," and words of similar import, when used in this application, shall refer to this application as a whole and not to any particular portions of this application. Where the context permits, words in the above Detailed Description using the singular or plural number may also include the plural or singular number respectively. The word "or" in reference to a list of two or more items, that word covers all of the following interpretations of the word: any of the items in the list, all of the items in the list, and any combination of the items in the list.

Moreover, conditional language used herein, such as, among others, "may," "could," "might," "can," "e.g.," "for example," "such as" and the like, unless specifically stated otherwise, or otherwise understood within the context as used, is generally intended to convey that certain embodiments include, while other embodiments do not include, certain features, elements and/or states. Thus, such conditional language is not generally intended to imply that features, elements and/or states are in any way required for one or more embodiments or that one or more embodiments necessarily include logic for deciding, with or without author input or prompting, whether these features, elements and/or states are included or are to be performed in any particular embodiment.

The above detailed description of embodiments of the invention is not intended to be exhaustive or to limit the invention to the precise form disclosed above. While specific embodiments of, and examples for, the invention are described above for illustrative purposes, various equivalent modifications are possible within the scope of the invention, as those skilled in the relevant art will recognize. For example, while processes or blocks are presented in a given order, alternative embodiments may perform routines having steps, or employ systems having blocks, in a different order, and some processes or blocks may be deleted, moved, added, subdivided, combined, and/or modified. Each of these processes or blocks may be implemented in a variety of different ways. Also, while processes or blocks are at times shown as being performed in series, these processes or blocks may instead be performed in parallel, or may be performed at different times.

The teachings of the invention provided herein can be applied to other systems, not necessarily the system described above. The elements and acts of the various embodiments described above can be combined to provide further embodiments.

While certain embodiments of the inventions have been described, these embodiments have been presented by way of example only, and are not intended to limit the scope of the disclosure. Indeed, the novel methods and systems described herein may be embodied in a variety of other forms; furthermore, various omissions, substitutions and changes in the form of the methods and systems described herein may be made without departing from the spirit of the disclosure. The accompanying claims and their equivalents are intended to cover such forms or modifications as would fall within the scope and spirit of the disclosure.

What is claimed is:

1. A mobile device comprising:

a transceiver configured to generate a first radio frequency transmit signal of a first frequency and a second radio frequency transmit signal of a second frequency;

a front end system including a multi-throw switch having a first input configured to receive the first radio frequency transmit signal and a second input configured to receive the second radio frequency transmit signal, the front end system further including a plurality of power amplifiers including a first power amplifier including an input connected to an output of the multi-throw switch; and an antenna array including a first antenna element including an input connected to an output of the first power amplifier, the first antenna element being a multi-resonant antenna implemented with separate resonant frequencies in different frequency bands, the first antenna element having a first resonant mode corresponding to the first frequency and a second resonant mode corresponding to the second frequency, the antenna array further including a first termination network directly connected to the input of the first antenna element and tuned to the first frequency to provide termination at the first frequency and a second termination network directly connected to the input of the first antenna element and tuned to the second frequency to provide termination at the second frequency.

2. The mobile device of claim 1 wherein the first resonant mode is in a 24 gigahertz frequency band and the second resonant mode is in a 39 gigahertz frequency band.

3. The mobile device of claim 1 wherein the plurality of power amplifiers further includes a second power amplifier, and the antenna array further includes a second antenna element connected to an output of the second power amplifier.

4. The mobile device of claim 1 wherein the first termination network and the second termination network are adjustable.

5. The mobile device of claim 1 wherein the first antenna element is a patch antenna.

6. The mobile device of claim 1 wherein the first antenna element is an edge-fired antenna.

7. The mobile device of claim 1 wherein the antenna array includes a plurality of cavity-based antennas formed along an edge of a laminated substrate, and the plurality of power amplifiers are formed on a semiconductor die attached to a major surface of the laminated substrate, the first antenna element corresponding to a multi-resonant cavity-based antenna of the antenna array.

8. The mobile device of claim 1 wherein the multi-throw switch receives a band control signal, the multi-throw switch operable to provide the input of the first power amplifier with the first radio frequency transmit signal in a first state of the band control signal, and to provide the input of the first power amplifier with the second radio frequency transmit signal in a second state of the band control signal.

9. A packaged module comprising:

a package substrate having an antenna array formed thereon, the antenna array including a first antenna element including an input, the first antenna element being a multi-resonant antenna implemented with separate resonant frequencies in different frequency bands, the first antenna element having a first resonant mode corresponding to a first frequency and a second resonant mode corresponding to a second frequency, the antenna array further including a first termination network directly connected to the input of the first antenna element and tuned to the first frequency to provide termination at the first frequency and a second termination network directly connected to the input of the first antenna element and tuned to the second frequency to provide termination at the second frequency; and a semiconductor die attached to the package substrate and having a multi-throw switch and a plurality of power amplifiers formed thereon, the multi-throw switch having a first input configured to receive a first radio frequency transmit signal of the first frequency and a second input configured to receive a second radio frequency transmit signal of the second frequency, the plurality of power amplifiers including a first power amplifier including an input connected to an output of the multi-throw switch.

10. The packaged module of claim 9 wherein the first resonant mode is in a 24 gigahertz frequency band and the second resonant mode is in a 39 gigahertz frequency band.

11. The packaged module of claim 9 wherein the first termination network and the second termination network are adjustable.

12. The packaged module of claim 9 wherein the first antenna element is a patch antenna on a surface of the package substrate.

13. The packaged module of claim 9 wherein the first antenna element is an edge-fired antenna on a side of the package substrate.

14. The packaged module of claim 9 wherein the antenna array includes a plurality of cavity-based antennas formed along an edge of a package substrate, and the semiconductor die is attached to a major surface of the package substrate, the first antenna element corresponding to a multi-resonant cavity-based antenna of the antenna array.

15. The packaged module of claim 9 wherein the multi-throw switch receives a band control signal, the multi-throw switch operable to provide the input of the first power amplifier with the first radio frequency transmit signal in a first state of the band control signal, and to provide the input of the first power amplifier with the second radio frequency transmit signal in a second state of the band control signal.

16. A power amplifier system comprising:

a multi-throw switch having a first input configured to receive a first radio frequency transmit signal of a first frequency and a second input configured to receive a second radio frequency transmit signal of a second frequency;

a plurality of power amplifiers including a first power amplifier including an input connected to an output of the multi-throw switch; and an antenna array including a first antenna element including an input connected to an output of the first power amplifier, the first antenna element being a multi-resonant antenna implemented with separate resonant frequencies in different frequency bands, the first antenna element having a first resonant mode corresponding to the first frequency and a second resonant mode corresponding to the second frequency, the antenna array further including a first termination network directly connected to the input of the first antenna element and tuned to the first frequency to provide termination at the first frequency and a second termination network directly connected to the input of the first antenna element and tuned to the second frequency to provide termination at the second frequency.

17. The power amplifier system of claim 16 wherein the first resonant mode is in a 24 gigahertz frequency band and the second resonant mode is in a 39 gigahertz frequency band.

18. The power amplifier system of claim 16 wherein the antenna array includes a plurality of cavity-based antennas formed along an edge of a laminated substrate, and the plurality of power amplifiers are formed on a semiconductor die attached to a major surface of the laminated substrate, the first antenna element corresponding to a multi-resonant cavity-based antenna of the antenna array.

19. The power amplifier system of claim 16 wherein the multi-throw switch receives a band control signal, the multi-throw switch operable to provide the input of the first power amplifier with the first radio frequency transmit signal in a first state of the band control signal, and to provide the input of the first power amplifier with the second radio frequency transmit signal in a second state of the band control signal.

20. The power amplifier system of claim 16 wherein the first termination network and the second termination network are adjustable.

* * * * *